US007281215B1

(12) United States Patent
Canfield et al.

(10) Patent No.: US 7,281,215 B1
(45) Date of Patent: Oct. 9, 2007

(54) IM CONVERSATION COUNTER AND INDICATOR

(75) Inventors: James Andrew Canfield, Arlington, VA (US); Kenneth Carbone, Annandale, VA (US); David Fairlie Colburn, Reston, VA (US); Linda Nols Myers, Purcellville, VA (US); Thomas E. Van Lenten, Ashburn, VA (US); Gregory Alan Willis, Arlington, VA (US)

(73) Assignee: AOL LLC, Dulles, VA (US)

( * ) Notice: Subject to any disclaimer, the term of this patent is extended or adjusted under 35 U.S.C. 154(b) by 689 days.

(21) Appl. No.: 10/208,187

(22) Filed: Jul. 31, 2002

Related U.S. Application Data

(60) Provisional application No. 60/376,181, filed on Apr. 30, 2002.

(51) Int. Cl.
*G06F 3/00* (2006.01)
(52) U.S. Cl. .................................... 715/752; 715/758
(58) Field of Classification Search ................ 715/752, 715/753, 754, 755, 756, 757, 758
See application file for complete search history.

(56) References Cited

U.S. PATENT DOCUMENTS

| | | |
|---|---|---|
| 5,283,560 A | 2/1994 | Bartlett |
| 5,287,514 A | 2/1994 | Gram |
| 5,416,895 A | 5/1995 | Anderson et al. |
| 5,544,352 A | 8/1996 | Egger |
| 5,546,528 A | 8/1996 | Johnston |
| 5,581,670 A | 12/1996 | Bier et al. |
| 5,588,107 A | 12/1996 | Bowden et al. |
| 5,617,114 A | 4/1997 | Bier et al. |
| 5,617,526 A | 4/1997 | Oran et al. |
| 5,627,960 A | 5/1997 | Clifford et al. |
| 5,644,737 A | 7/1997 | Tuniman et al. |
| 5,664,133 A | 9/1997 | Malamud et al. |
| 5,692,142 A | 11/1997 | Craycroft et al. |
| 5,712,995 A | 1/1998 | Cohn |
| 5,721,852 A * | 2/1998 | Porter ........................ 715/777 |
| 5,742,813 A | 4/1998 | Kavanagh et al. |
| 5,754,176 A | 5/1998 | Crawford |
| 5,760,768 A | 6/1998 | Gram |
| 5,798,752 A | 8/1998 | Buxton et al. |
| 5,801,703 A | 9/1998 | Bowden et al. |
| 5,832,494 A | 11/1998 | Egger et al. |
| 5,838,315 A | 11/1998 | Craycroft et al. |
| 5,877,758 A | 3/1999 | Seybold |

(Continued)

OTHER PUBLICATIONS

Amanda Matthiesen, "Hotmail Help: A Brief Introduction to the Free E-mail Service", May 2000, Internet: http://www.town.brookline.ma.us/library/computer/hotmail.htm.*

(Continued)

*Primary Examiner*—Kristine Kincaid
*Assistant Examiner*—Ryan Pitaro
(74) *Attorney, Agent, or Firm*—Fish & Richardson P.C.

(57) ABSTRACT

A user interface that enables user perception of status regarding communications that leverage an instant messaging platform may be rendered on a display. The user interface includes an instant messaging application user interface that enables perception and selection of instant messages for an instant messaging user, and a status indicator that provides a perceivable indication to the user of statistics regarding concurrent instant messaging sessions.

54 Claims, 13 Drawing Sheets

U.S. PATENT DOCUMENTS

| | | | |
|---|---|---|---|
| 5,877,765 | A | 3/1999 | Dickman et al. |
| 5,884,306 | A | 3/1999 | Bliss et al. |
| 5,929,851 | A | 7/1999 | Donnelly |
| 5,937,417 | A | 8/1999 | Nielsen |
| 5,974,413 | A | 10/1999 | Beauregard et al. |
| 5,990,905 | A | 11/1999 | Chew et al. |
| 5,995,101 | A | 11/1999 | Clark et al. |
| 6,002,398 | A | 12/1999 | Wilson |
| 6,002,400 | A | 12/1999 | Loring et al. |
| 6,018,571 | A | 1/2000 | Langlois et al. |
| 6,057,844 | A | 5/2000 | Strauss |
| 6,078,935 | A | 6/2000 | Nielsen |
| 6,091,409 | A | 7/2000 | Dickman et al. |
| 6,092,068 | A | 7/2000 | Dinkelacker |
| 6,097,389 | A | 8/2000 | Morris et al. |
| 6,118,427 | A | 9/2000 | Buxton et al. |
| 6,144,375 | A | 11/2000 | Jain et al. |
| 6,147,685 | A | 11/2000 | Bliss et al. |
| 6,173,316 | B1* | 1/2001 | De Boor et al. ............ 709/227 |
| 6,188,403 | B1 | 2/2001 | Sacerdoti et al. |
| 6,229,539 | B1 | 5/2001 | Morcos et al. |
| 6,233,571 | B1 | 5/2001 | Egger et al. |
| 6,233,726 | B1 | 5/2001 | Bowman et al. |
| 6,237,135 | B1 | 5/2001 | Timbol |
| 6,246,411 | B1 | 6/2001 | Strauss |
| 6,248,946 | B1 | 6/2001 | Dwek |
| 6,252,594 | B1 | 6/2001 | Xia et al. |
| 6,260,148 | B1 | 7/2001 | Aggarwal et al. |
| 6,275,790 | B1 | 8/2001 | Yamamoto et al. |
| 6,281,879 | B1 | 8/2001 | Graham |
| 6,301,609 | B1 | 10/2001 | Aravamudan et al. |
| 6,304,879 | B1 | 10/2001 | Sobeski et al. |
| 6,317,128 | B1 | 11/2001 | Harrison et al. |
| 6,346,952 | B1 | 2/2002 | Shtivelman |
| 6,362,842 | B1 | 3/2002 | Tahara et al. |
| 6,369,837 | B1 | 4/2002 | Schirmer |
| 6,377,944 | B1 | 4/2002 | Busey et al. |
| 6,381,735 | B1 | 4/2002 | Hunt |
| 6,384,849 | B1 | 5/2002 | Morcos et al. |
| 6,407,757 | B1 | 6/2002 | Ho |
| 6,434,599 | B1 | 8/2002 | Porter |
| 6,519,629 | B2 | 2/2003 | Harvey et al. |
| 6,539,421 | B1 | 3/2003 | Appelman et al. |
| 6,731,308 | B1* | 5/2004 | Tang et al. ................ 715/751 |
| 6,784,901 | B1 | 8/2004 | Harvey et al. |
| 6,907,447 | B1* | 6/2005 | Cooperman et al. ........ 709/203 |
| 6,981,223 | B2 | 12/2005 | Becker |
| 2002/0073207 | A1* | 6/2002 | Widger et al. ............... 709/227 |
| 2002/0097277 | A1* | 7/2002 | Pitroda ....................... 345/854 |
| 2002/0101446 | A1 | 8/2002 | Tang |
| 2002/0130904 | A1* | 9/2002 | Becker et al. ............... 345/753 |
| 2002/0160819 | A1* | 10/2002 | Daurensan .................. 455/567 |
| 2003/0030670 | A1* | 2/2003 | Duarte et al. ................ 345/758 |
| 2003/0052915 | A1* | 3/2003 | Brown et al. ............... 345/752 |
| 2003/0142141 | A1* | 7/2003 | Brown et al. ............... 345/805 |
| 2003/0164862 | A1 | 9/2003 | Cadiz et al. |
| 2003/0210265 | A1* | 11/2003 | Haimberg ................... 345/758 |

OTHER PUBLICATIONS

Tricon Software, "Tricon Software & Development", Apr. 20, 2001, Internet: http://www.triconsoft.com.*

Microsoft, Microsoft Outlook 2000, Software, SP-3, Figures 12-16.*

"Design Requirements Document (DRD)," Instant AOL, Instant AOL Refresh v1.1, Document Version 8.0, Oct. 23, 2001, 8 pages.

"Design Requirements Document (DRD)," Gamera, Revision 18, Apr. 10, 2001, 110 pages.

Anonymous "GameSpy Arcade—Play Hundreds of Online Multiplayer Games", Internet Document, [Online], pp. 1-3, retrieved from the internet, http://www.gamespyarcade.com/support/help/communicate.shtml [retrieved on Apr. 12, 2004].

"AOL IM Companion", Tricon Software & Development, published Mar. 7, 2001. 7 total pages retrieved Jul. 16, 2003 from World Wide Web: http://download.com.com/3000-2150-5056089.html?legacy=cnet (1 page); http://www.triconsoft.com/screenshots/mnuIMAnswer.jpg (1 page); http://www.triconsoft.com/screenshots/mnuOptions.jpg (1 page); http://www.triconsoft.com/screenshots/IMCompanionTabs.jpg (1 page); http://www.triconsoft.com/screenshots/IMCompanionListBox.jpg (1 page); http://www.triconsoft.com/IMCompanion.asp (2 pages).

"Move or Cover Sheets", Microsoft Excel 2000 Help File. 8 total pages retrieved Jul. 21, 2003 from World Wide Web: http://www.triconsoft.com/IMCompanionShots.asp (4 pages); mk:@MSITStore:C:\Program%20Files\Microsoft%20Office\Office\1033\xlmain9.chm::/htm . . . (1 page); About Microsoft Excel (3 pages).

"A.I.M Frames", BPS Software, lastest version Jul. 3, 2003, first published version Jun. 1, 1998. 7 total pages retrieved Jul. 11, 2003 from World Wide Web: http://www.bpssoft.com/AIMFrame/index.htm (3 pages); http://www.bpssoft.com/AIMFrame/history.htm (4 pages).

"Power Tools Pro", BPS Software, first published release May 10, 2000. 24 total pages retrieved Jul. 16, 2003 from World Wide Web: http://www.bpssoft.com/PowerTools/history.htm (19 pages); http://www.bpssoft.com/PowerTools/images/shots/9pwrim.gif (1 page); http://www.bpssoft.com/PowerTools/ptshots.htm (4 pages).

International Search Report (6 pages).

* cited by examiner

IM CONVERSATION COUNTER AND INDICATOR

This application claims priority from U.S. Provisional Application No. 60/376,181, filed Apr. 30, 2002, which is incorporated by reference.

TECHNICAL FIELD

The following description relates generally to providing a graphical user interface and more particularly to providing an IM conversation counter and indicator for a tabbed instant messaging user interface.

BACKGROUND

Online service providers facilitate access to information and services by providing interactive UIs (User Interfaces) that help users navigate to desired resources. UIs often take advantage of the graphics capabilities of a user's computer and eliminate the need to manually type text commands. Generally, a UI allows a user to simply select screen objects such as icons, windows, and drop-down menus to execute particular commands or to link to certain locations. The design of a UI has a significant impact on a user's online experience. In particular, the icons, windows, and menus of a UI must be arranged to enable a user to locate preferred information and services quickly and easily. Conventionally, navigation among interfaces corresponding to separate communications sessions was accomplished through the selection if disparate icons appearing in an operating system task bar, where the icons appeared along with other icons that did not correspond to communications sessions.

SUMMARY

In one general aspect, a user interface that enables user perception of status regarding communications that leverage an instant messaging platform may be rendered on a display. The user interface includes an instant messaging application user interface that enables perception and selection of instant messages for an instant messaging user, and a status indicator that provides a perceivable indication to the user of statistics regarding concurrent instant messaging sessions.

Implementations may include one or more of the following features. For example, the user interface may also include one or more instant messaging sub-interfaces that represent distinct and concurrent instant messaging communications sessions. In one implementation, the user interface includes a perceivable status indication that a new message is pending in at least one concurrent instant messaging session.

In another implementation, the user interface also includes a mechanism to determine the statistics. The statistics may include one or more of the following: a total number of concurrent instant messaging sessions; a number of instant messaging sessions with new messages; a number of new instant messaging sessions; and a number of new instant messages. The number of instant messaging sessions with new messages may further include a number of new instant messaging sessions with new messages and a number of old instant messaging sessions with new messages.

The statistics may be rendered in numerous positions on the display. For example, the statistics may be rendered in a title bar, in a tab header in an interface having persistent tabs, in an operating system tray, in a user interface toolbar, in a general interface that persists beyond active display of the user interface, or in a general interface actionable item that is arranged in a position on the display and that persists beyond active display of the user interface, where the general user interface actionable item enables activation of the user interface.

In one implementation, the user interface is a visual interface. In another implementation, the user interface is an audible interface.

Aspects of the IM conversation counter and indicator for a tabbed IM user interface may be implemented by an apparatus and/or by a computer program stored on a computer readable medium. The computer readable medium may comprise a disc, a client device, a host device, and/or a propagated signal. In addition, aspects of the IM conversation counter and indicator for a tabbed IM user interface may be implemented in a client/host context or in a standalone or offline client device. The IM conversation counter and indicator for a tabbed IM user interface may be rendered in a client/host context and may be accessed or updated through a remote device in a client/host environment. The IM conversation counter and indicator for a tabbed IM user interface also may be rendered by the stanalone/offline device and may be accessed or updated through a remote device in a non-client/host environment such as, for example, a LAN server serving an end user or a mainframe serving a terminal device.

Other features and advantages will be apparent from the following description, including the drawings, and from the claims.

DESCRIPTION OF DRAWINGS

Like reference symbols in the various drawings indicate like elements.

DETAILED DESCRIPTION

Figure 1:
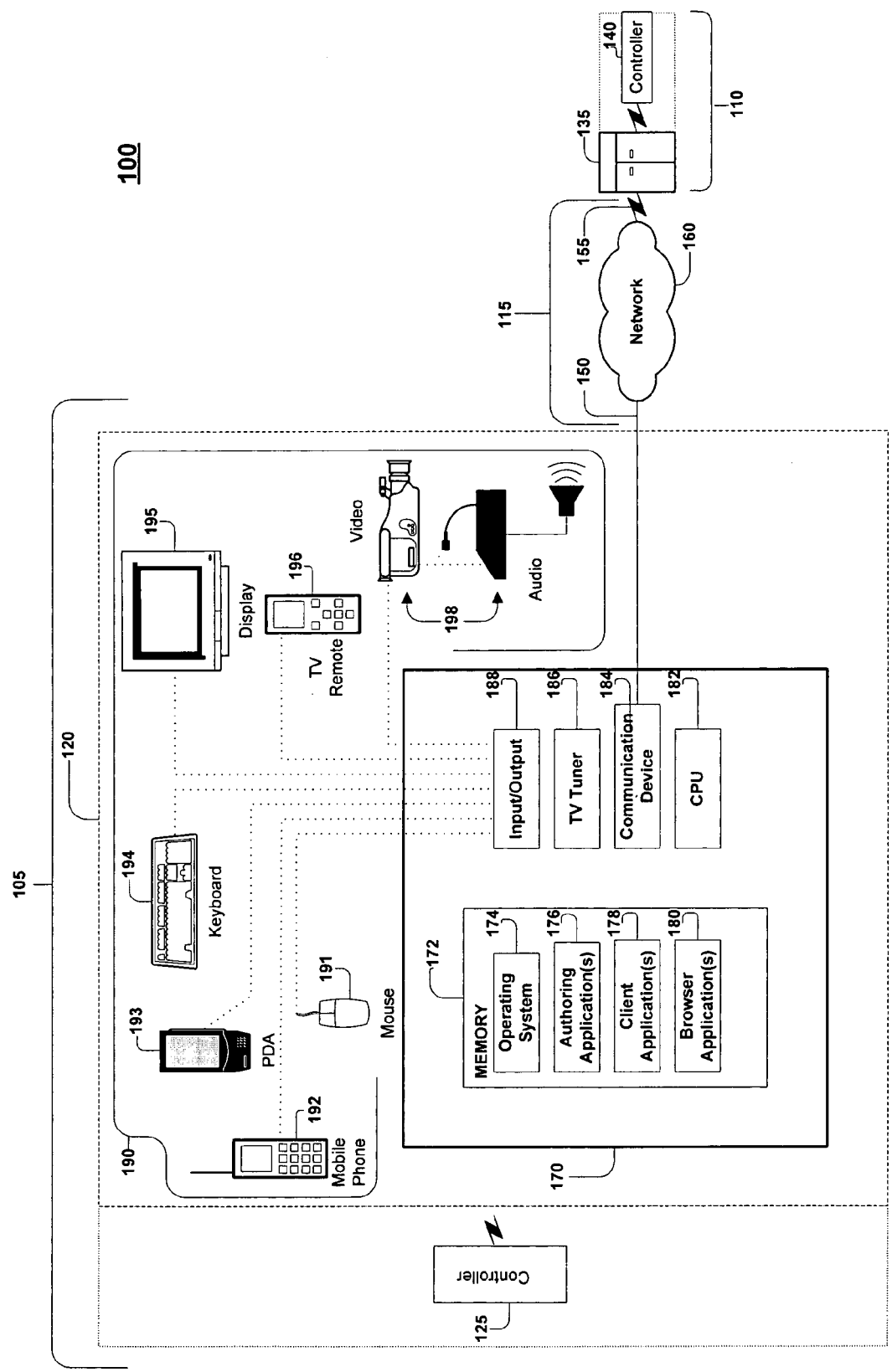
FIGS. 1-4 are block diagrams of a communications system.

In general, an IM conversation counter and indicator may be provided for a tabbed instant messaging (IM) user interface (UI), and the tabbed IM UI may have one or more IM interface tabs. Each interface tab is assigned to a pending IM session, and the tabs appear adjacent to one another to, among other things, help ease switching between IM sessions. An active tab is rendered for the IM session currently being viewed by the user, and inactive tabs are rendered for the IM sessions which are not currently being viewed by the user. A interface tab typically includes an identifier, such as the screen name of an IM buddy, to identify the particular IM session to which it is assigned. When displayed, the identifier for an IM session is configured such that a user is able to read or otherwise recognize the identifier no matter how many other IM sessions are pending. An interface tab also includes a status indicator to indicate whether a new IM message is waiting to be viewed for that session. A conversation counter may be provided to inform the user of information relating to the concurrent IM sessions, such as the total number of concurrent IM sessions, the number of new IM sessions, and the number of ongoing IM sessions having a new IM message waiting to be viewed. A scroll bar is provided for scrolling to perceive tabs corresponding to open IM sessions when the total number of concurrent IM sessions exceeds the maximum number of concurrent conversations that may be displayed simultaneously. The scroll bar allows a user to scroll up and down among the concurrent IM sessions, and may provide an indication that one or more of the IM sessions "hidden" by the scroll bar has a new IM message waiting to be viewed.

In one implementation, an IM counter and indicator is provided on a tabbed IM UI to count the total number of concurrent IM sessions, the number of new IM sessions, and/or the number of new messages from ongoing IM sessions. A new IM session (i.e., a new conversation) may be flagged differently from an ongoing IM session with a new message. Thus, a user knows if and how many new IM sessions and/or new IM messages are present, even when viewing a different content area. Furthermore, when using the tabbed instant message (IM) user interface, new IM messages may or may not be forced into the foreground.

An indicator is provided to the user to indicate whether the user has viewed a received IM message in an existing IM session. For example, an indicator such as a blinking interface tab or area on an interface tab may be provided for a received IM message that has not been viewed. When the user views the received IM, the indicator may change to a solid IM interface tab or area on an interface tab. The user will be able to know that a new, unviewed message has been received without having to close a window or leave a current IM session, and once viewed, the indicator changes without having to actually reply to the message itself. A different visual indication may be provided for a new IM session to distinguish the new session from a new message in an old session. The tabbed IM user interface may be rendered in response to user manipulation of a general IM user interface tab.

The IM conversation counter and indicator for a tabbed IM user interface may be rendered by any type of hardware, software, device, computer, computer system, equipment, component, program, application, code, storage medium, or propagated signal. In one implementation, the IM conversation counter and indicator for a tabbed IM user interface may be rendered in a client/host context, and the IM conversation counter and indicator for a tabbed IM user interface may be accessed or updated through a remote device in a client/host environment. In another implementation, the IM conversation counter and indicator for a tabbed IM user interface may be implemented in a standalone or offline client context. The IM conversation counter and indicator for a tabbed IM user interface may be rendered by the standalone/offline device and may be accessed or updated through a remote device in a non-client/host environment such as, for example, a LAN server serving an end user or a mainframe serving a terminal device.

Typically, instant messaging communications involves an instantaneous or nearly instantaneous communication between two users, where each user is provided with online presence information regarding other selected users ("buddies").

Figure 2:
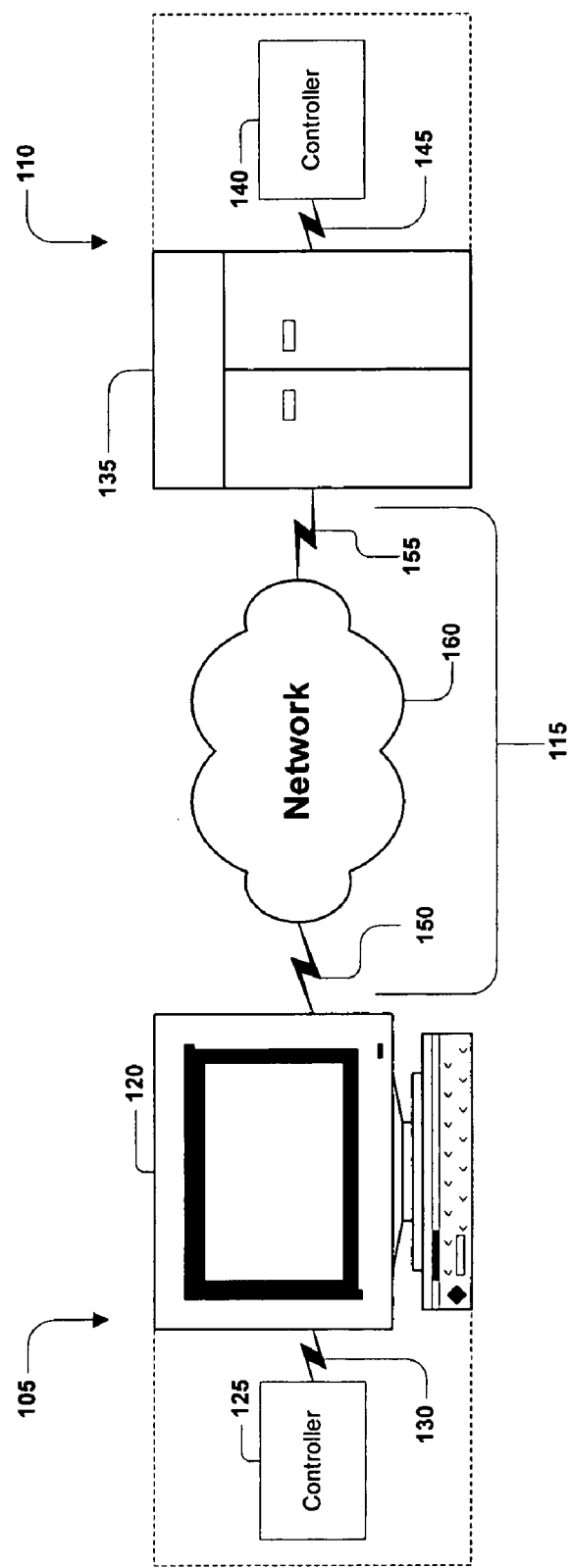

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

FIG. 1 illustrates a communications system 100 including a client system 105 communicating with a host system 110 through a communications link 115.

The client device 120 typically includes a general-purpose computer 170 having an internal or external storage 172 for storing data and programs such as an operating system 174 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 176 (e.g., word processing, database programs, spreadsheet programs, or graphics programs) capable of generating documents or other electronic content; client applications 178 (e.g., AOL client, CompuServe client, AIM client, AOL TV client, ISP client, or IM client) capable of communicating with other computer users, accessing various computer resources, and viewing, creating, or otherwise manipulating electronic content; and browser applications 180 (e.g., Netscape's Navigator or Microsoft's Internet Explorer) capable of rendering standard Internet content.

The general-purpose computer 170 also includes a central processing unit 182 (CPU) for executing instructions in response to commands from the client controller 125. In one implementation, the client controller 125 includes one or more of the application programs installed on the internal or external storage 172 of the general-purpose computer 170. In another implementation, the client controller 125 includes application programs externally stored in and performed by one or more device(s) external to the general-purpose computer 170.

The general-purpose computer typically will include a communication device 184 for sending and receiving data. One example of the communication device 184 is a modem. Other examples include a transceiver, a set-top box, a communication card, a satellite dish, an antenna, or another network adapter capable of transmitting and receiving data over the communications link 115 through a wired or wireless data pathway 150. The general-purpose computer 170 also may be a television ("TV") tuner 186 for receiving television programming in the form of broadcast, satellite, and/or cable TV signals. As a result, the client device 120 can selectively and/or simultaneously display network content received by communications device 184 and television programming content received by the TV tuner 186.

The general-purpose computer 170 typically will include an input/output interface 188 for wired or wireless connection to various peripheral devices 190. Examples of peripheral devices 190 include, but are not limited to, a mouse 191, a mobile phone 192, a personal digital assistant 193 (PDA), an MP3 player (not shown), a keyboard 194, a display monitor 195 with or without a touch screen input, a TV remote control 196 for receiving information from and rendering information to users, and an audiovisual input device 198.

Although FIG. 1 illustrates devices such as a mobile telephone 192, a PDA 193, and a TV remote control 196 as being peripheral with respect to the general-purpose computer 170, in another implementation, such devices may themselves include the functionality of the general-purpose computer 170 and operate as the client device 120. For example, the mobile phone 192 or the PDA 193 may include computing and networking capabilities and function as a client device 120 by accessing the delivery network 160 and communicating with the host system 110. Furthermore, the client system 105 may include one, some or all of the components and devices described above.

A graphical user interface, such as a tabbed IM user interface, may be displayed on the display monitor 195 or other peripheral device 190. A tabbed IM user interface includes one or more tabs located adjacent to one another, and each tab is assigned to an IM session. An IM conversation counter and indicator may be provided for the tabbed IM user interface.

Referring to FIG. 2, a communications system 200 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operated within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively wired or wireless data pathways 130 and 145, which are capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operated as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, or satellite systems, and any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 3:
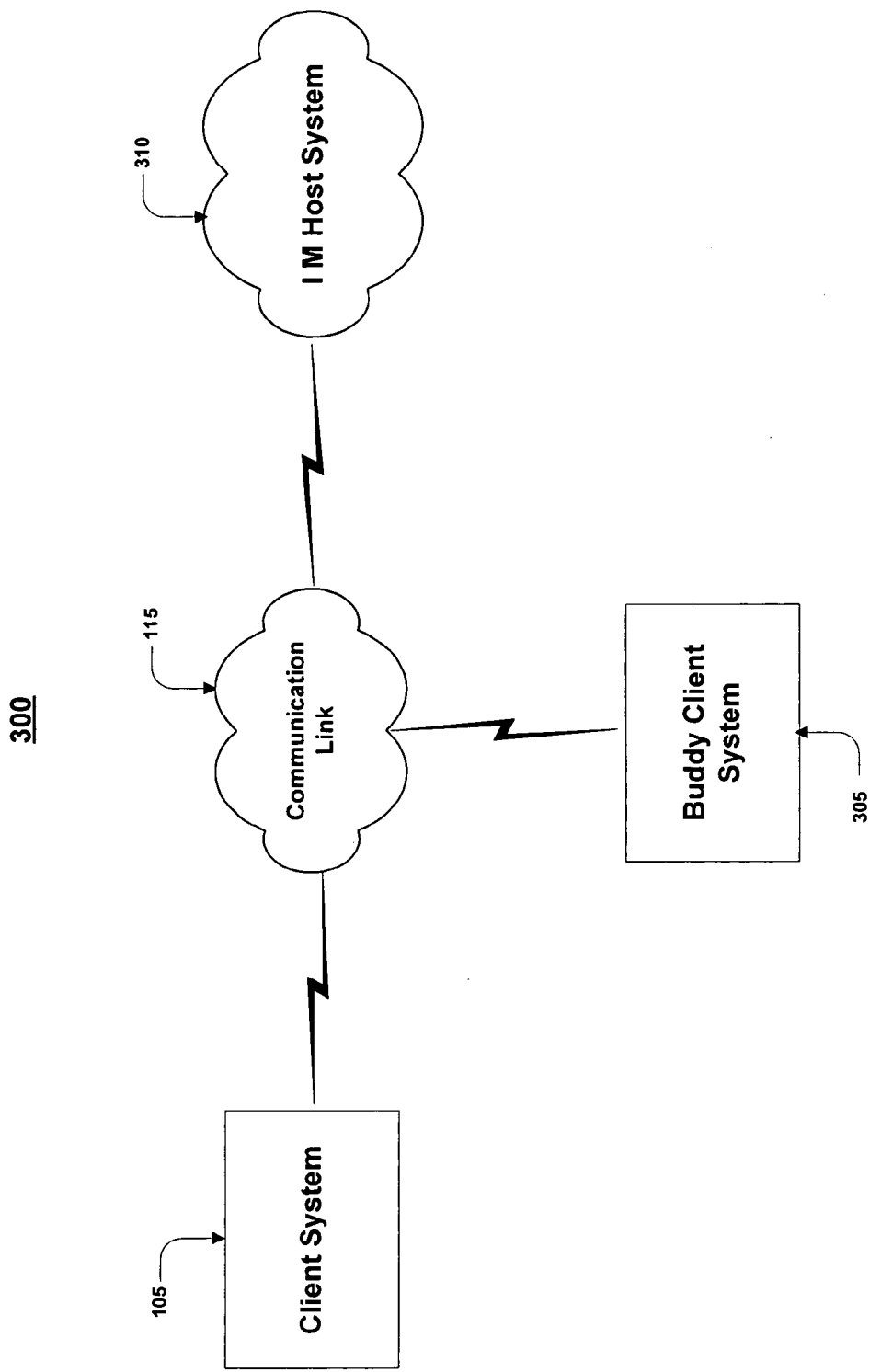

FIG. 3 illustrates a communications system 300 including a client system 105 communicating with a buddy client system 305 and an IM host system 310 through a communication link 115. Such a communications system may be used by users of IM service providers, such as, for example, AIM, ICQ, Yahoo Messenger, and Microsoft Messenger.

In one implementation, the IM host system 310 may have characteristics similar to those described above with respect to host system 110. The client system 105 and the buddy client system 305 may include communication software to enable access to the IM host system 310 by users.

In general, the IM host system 310 supports instant messaging services irrespective of a user's network or Internet access. Thus, the IM host system 310 allows users to send and receive instant messages, regardless of whether they have access to any particular ISP. The IM host system 310 may support associated services, such as administrative matters, advertising, directory services, chat, and interest groups related to the instant messaging. The IM host system 310 has an architecture that enables the machines (e.g., servers) within the IM host system 310 to communicate with each other. To transfer data, the IM host system 310 employs one or more standard or exclusive IM protocols.

To access the IM host system 310 to begin an instant messaging session in the implementation of FIG. 3, the client system 105 establishes a connection to the IM host system 310. Once a connection to the IM host system 310 has been established, the client system 105 may directly or indirectly transmit data to and access content from the IM host system 310. By accessing the IM host system, a user can use the IM client application to view whether particular users ("buddies") are online, exchange instant messages with particular buddies, participate in group chat rooms, trade files such as pictures, invitations or documents, find other buddies with similar interests, get customized information such as news and stock quotes, and search the Web.

For example a user who is using client system 105 may view whether a buddy using buddy client system 305 is online, and typically may view whether the buddy is able to receive instant messages. If the buddy is online, the user may exchange instant messages with that buddy. In one implementation, the instant messages sent between client system 105 and buddy client system 305 are routed through IM host system 310. In another implementation, the instant messages sent between client system 105 and buddy client system 305 are routed through a third party server (not shown), and also may or may not be routed through IM host system 310. In yet another implementation, the instant messages are sent directly between client system 105 and buddy client system 305.

Figure 4:
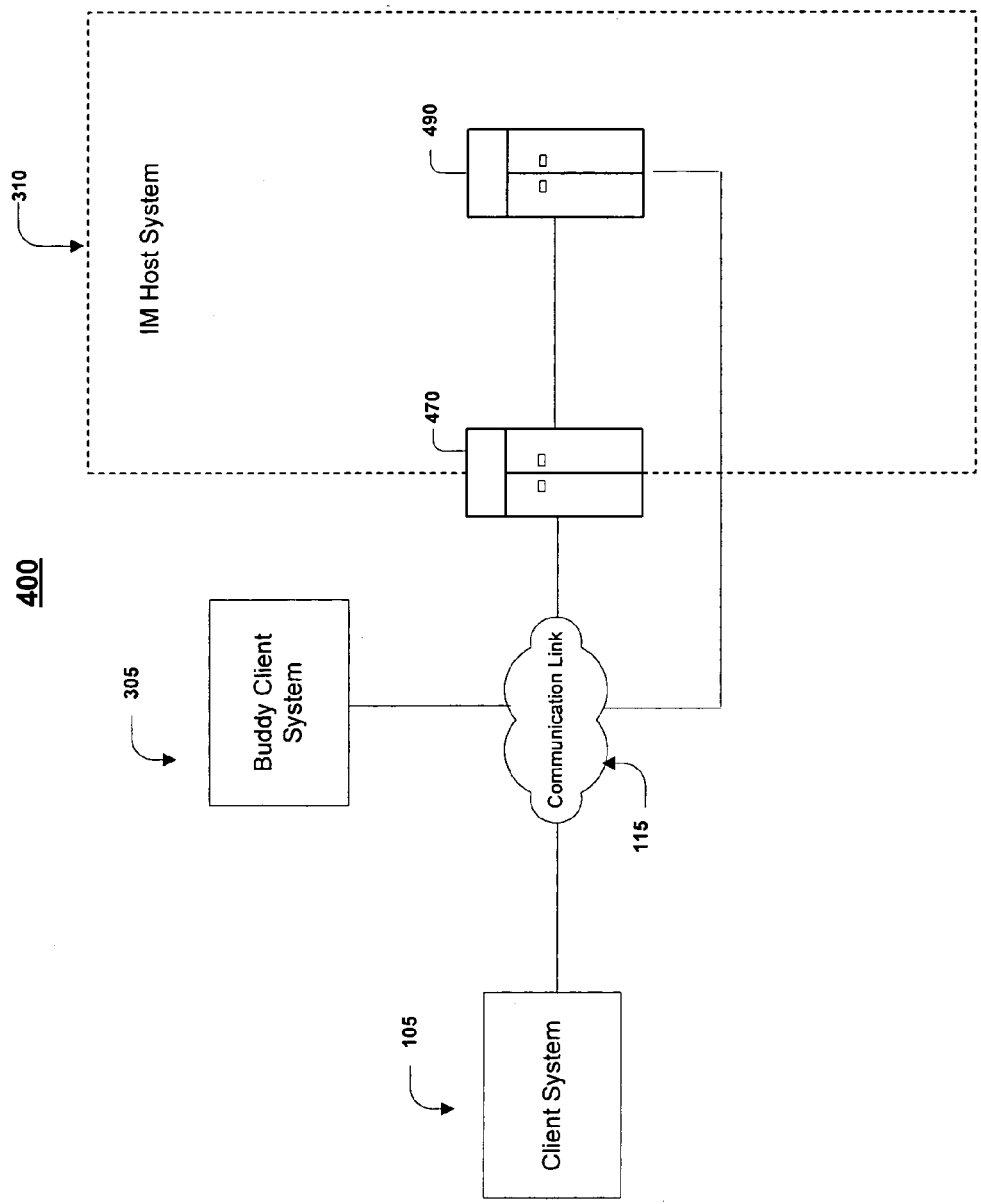

FIG. 4 illustrates a communications system 400 including a client system 105 communicating with a buddy client system 305 and an IM host system 310 through a communication link 115. System 400 illustrates a possible implementation of the communications system 300 of FIG. 3.

In the implementation shown in FIG. 4, the IM host system 310 includes a login server 470 for enabling access by users and routing communications between the client system 105 and other elements of the IM host system 310. The IM host system 310 also includes an IM server 490. To enable access to the IM host system 310 by users, the client system 105 and the buddy client system 305 include communication software, such as for example, an OSP client application and an IM client application. The OSP and IM communication software applications are designed to facilitate a user's interactions with the IM service.

In general, the IM host system 310 supports instant messaging services irrespective of a user's network or Internet access. Thus, the IM host system 310 allows users to send and receive instant messages, regardless of whether they have access to any particular ISP. The IM host system 310 may support associated services, such as administrative matters, advertising, directory services, chat, and interest groups related to the instant messaging. The IM host system 310 has an architecture that enables the machines (e.g., servers) within the IM host system 310 to communicate with each other. To transfer data, the IM host system 310 employs one or more standard or exclusive IM protocols.

To access the IM host system 310 to begin an instant messaging session in the implementation of FIG. 4, the client system 105 establishes a connection to the login server 470. The login server 470 typically determines whether the particular user is authorized to access the IM host system 310 by verifying a user identification and password. If the user is authorized to access the IM host system 310, the login server 470 usually employs a hashing technique on the user's screen name to identify a particular IM server 490 within the IM host system 310 for use during the user's session. The login server 470 provides the client system 105 with the IP address of the IM server 490, gives the client system 105 an encrypted key (e.g., a cookie), and breaks the connection. The client system 105 then uses the IP address to establish a connection to the particular IM server 490 through the communication link 115, and obtains access to the IM server 490 using the encrypted key. Typically, the client system 105 will be able to establish an open TCP connection to the IM server 490. The buddy client system 305 establishes a connection to the IM host system 310 in a similar manner.

Once a connection to the IM server 490 has been established, the client system 105 may directly or indirectly transmit data to and access content from the IM server 490. By accessing the IM server, a user can use the IM client application to view whether particular users ("buddies") are online, exchange instant messages with particular buddies, participate in group chat rooms, trade files such as pictures, invitations or documents, find other buddies with similar interests, get customized news and stock quotes, and search the Web. For example a user who is using client system 105 may view whether a buddy using buddy client system 305 is online, and if so may exchange instant messages with that buddy. In one implementation, the instant messages sent between client system 105 and buddy client system 305 are routed through IM host system 310. In another implementation, the instant messages sent between client system 105 and buddy client system 305 are routed through a third party server (not shown), and may or may not also be routed through IM host system 310. In yet another implementation, the instant messages are sent directly between client system 105 and buddy client system 305.

In one implementation, the IM host system 310 also includes a user profile server (not shown) connected to a database (not shown) for storing large amounts of user profile data. The user profile server may be used to enter, retrieve, edit, manipulate, or otherwise process user profile data. In one implementation, a user's profile data includes, for example, the user's screen name, the user's buddy list, identified interests, and geographic location. The user may enter, edit and/or delete profile data using an installed IM client application on the client system 105 to interact with the user profile server.

Because the user's data are stored in the IM host system 310, the user does not have to reenter or update such information in the event that the user accesses the IM host system 310 using new or a different client system 105. Accordingly, when a user accesses the IM host system 310, the IM server can instruct the user profile server to retrieve the user's profile data from the database and to provide, for example, the user's buddy list to the IM server. Alternatively, user profile data may be saved locally on the client device 105.

Figure 5:
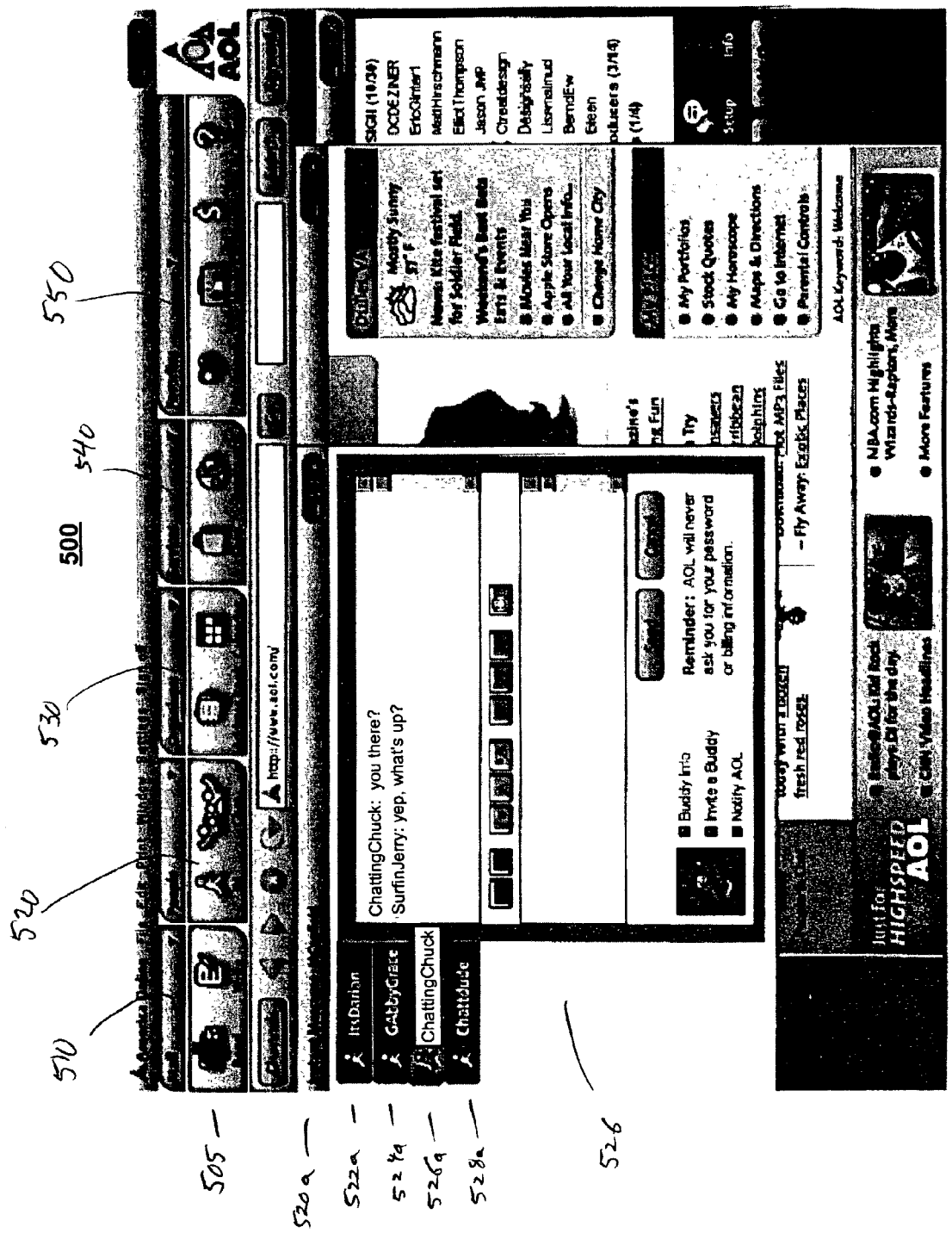
FIGS. 5-12 are illustrations of different graphical user interfaces that may be implemented by the systems of FIGS. 1-4 when executing the process of FIG. 13.

FIG. 5 illustrates an example of a user interface (UI) 500, which example may be presented to a user of an online service provider such as AOL. The UI 500 includes a toolbar 505 for quickly enabling activation of features such as, for example, reading or writing e-mail, exchanging IM messages with another user, entering chat areas with other users, shopping or accessing the internet. The toolbar 505 may include one or more general interface actionable items 510, 520, 530, 540, and 550, each of which is configured to enable activation of an associated user interface. The actionable time may be, for example, a button or a tab. For example, general actionable item 520 is configured to enable activation of associated Instant Message (IM) interface 520a. The IM interface 520a is a tabbed IM interface. IM interface 520a includes one or more sub-interfaces each having an associated tab and representing a distinct and concurrent communications session. For example, sub-interface 526 has an associated tab 526a, and represents a distinct and concurrent communications session. As shown in sub-interface 526, the user (SurfinJerry) is able to view a communications session with buddy "ChattingChuck." The tab 526a persists beyond display of the associated sub-interface 526, identifies the communications session, and allows the user to activate the sub-interface 526 if not currently displayed. The interface tabs 522a, 524a, 526a, 528a, are arranged in a group such that each interface tab is close to another interface tab. The adjacent placement of the interface tabs assists with the user identification, selection, and activation of the tabs.

Figure 6:
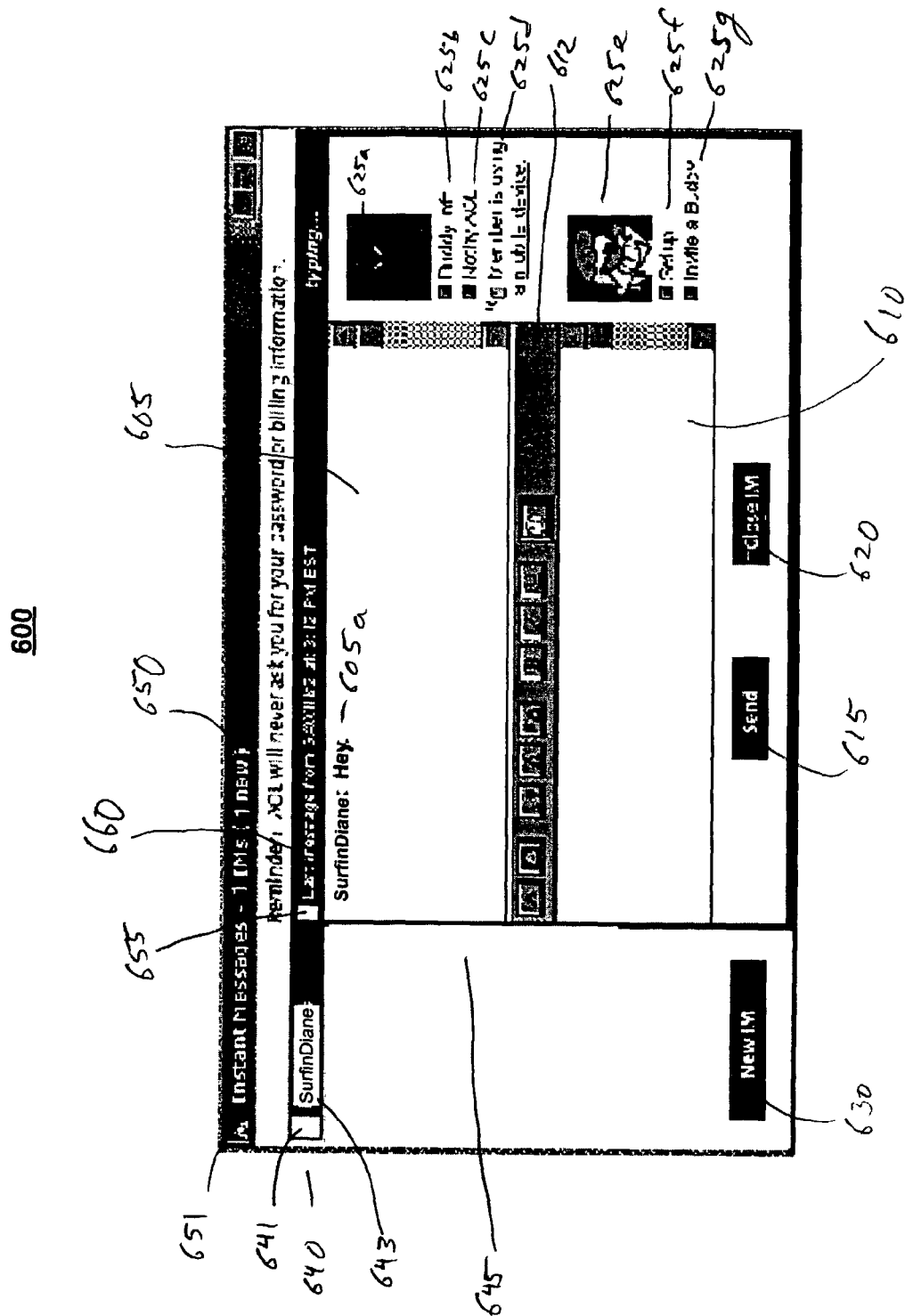

FIG. 6 illustrates one example of a tabbed IM user interface (UI) 600, which example may be presented to a user of an IM service provider such as the AOL Instant Messenger (AIM) service provided by America Online. The UI 600 may be rendered in response to user manipulation of a general interface tab. In general, the tabbed IM user interface 600 will be rendered on the user's client system 105 using software stored on that client system 105. An IM conversation counter and indicator may be provided for the tabbed IM user interface.

The UI 600 includes an IM display area 605 to display the messages 605a of an active IM session represented by sub-interface 645 and interface tab 640. In the example of FIG. 6, the active IM session involves the buddy having a screen name of "SurfinDiane." An IM compose area 610 may be used to compose a message to send to the IM buddy in the active IM session, typically by clicking on the send control button 615 in the UI. Font and appearance controls 612 may be provided to control how the message being entered in the IM compose area 610 is displayed to the IM buddy and in the IM display area 605 once the message in the IM compose area 610 is sent. A control button 620 may be provided to close the active IM session. The message 605a may include the identity of an IM buddy along with a message from that buddy.

An area 625 may be provided to display various icons and controls. For example, the area 625 may include a buddy icon 625a corresponding to the IM buddy from which the message 605a was received, and a buddy icon 625c corresponding to the user who has received and is viewing the message 605a. Other controls may be provided, including a control 625b to retrieve information about the IM buddy, a control 625c to notify the service provider of inappropriate behavior by the IM buddy, a control 625d to indicate to the user whether the IM buddy is using a mobile device, a control 625f to setup various features of the service, and a control 625g to invite a new buddy to join in the IM session, among others. Also, a control button 630 may be provided to initiate a new IM session with a different IM buddy.

The UI 600 contains at least one interface tab 640 associated with a sub-interface 645, and each interface tab is assigned to a pending IM session with an IM buddy who typically is identified by a screen name which may be shown, for example, by an identifier 643. The IM buddy typically is another user or an automated system, such as an artificial intelligence system having a screen name that responds to IM queries from a user. An active tab corresponds to the IM session that the user views or with which the user interacts currently, and inactive tabs (not shown) corresponds to the other concurrent IM sessions with which the user does not currently view or interact. The example of FIG. 6 shows only one interface tab 640, which is presumed an active tab for purposes of discussion and illustration.

The UI 600 includes a conversation counter 650 that provides information relating to the concurrent IM sessions, such as the total number of concurrent IM sessions, the number of new IM sessions, and the number of ongoing IM sessions having a new IM message waiting to be viewed. In general, the conversation counter 650 provides a perceivable indication to the user of statistics regarding the concurrent instant messaging session. The conversation counter may be rendered in numerous positions on the display. For example, the conversation counter may be rendered in a title bar 651, in a tab header 643 for an interface having persistent tabs, in an operating system tray (not shown), in a user interface toolbar 505, in a general interface 500 that persists beyond active display of the user interface 600, or in a general interface actionable item 520 that is arranged in a position on the display and that persists beyond active display of the user interface 600, where the general user interface action item 520 enable activation of the user interface 600. In the example of FIG. 6, the conversation counter 650 indicates that there is only one concurrent IM session, and one new IM message. The UI 600 also includes a manual status control 655 to enable the user to manually indicate whether the last message from the IM buddy corresponding to the IM session for the active tab displayed in the IM display area 605 has been viewed or acknowledge, without having to send an actual reply message to extinguish the new message status. The UI 600 also includes a last message information indicator 660 that provides information about the time that the last message was received from an IM buddy.

The interface tab 640 includes a status indicator 641 to indicate whether a new IM message within the IM session corresponding to interface tab 640 remains pending for review. In general, the indicator 641 provides a perceivable status indication to the user that a new message is pending in at least one concurrent instant messaging session. The indicator may be rendered in numerous positions on the display. For example, the indicator 641 may be rendered in a title bar 651, in a tab header 643 for an interface having persistent tabs, in an operating system tray (not shown), in a user interface toolbar 505, in a general interface 500 that persists beyond active display of the user interface 600, or in a general interface actionable item 520 that is arranged in a position on the display and that persists beyond active display of the user interface 600, where the general user interface action item 520 enable activation of the user interface 600. Once the new message is viewed or acknowledge, the indicator 641 changes and the conversation counter 650 is updated to reflect one fewer message waiting to be viewed. The interface tab 640 also includes an identifier 643, in this case the screen name of the IM buddy "SurfinDiane," to identify the particular IM session to which it is assigned. Although not shown in FIG. 6, either the conversation counter 650 or the indicator 643, or both, may distinguish between a new message received from an ongoing IM session and new message received as part of the initiation of a new IM session.

Figure 7:
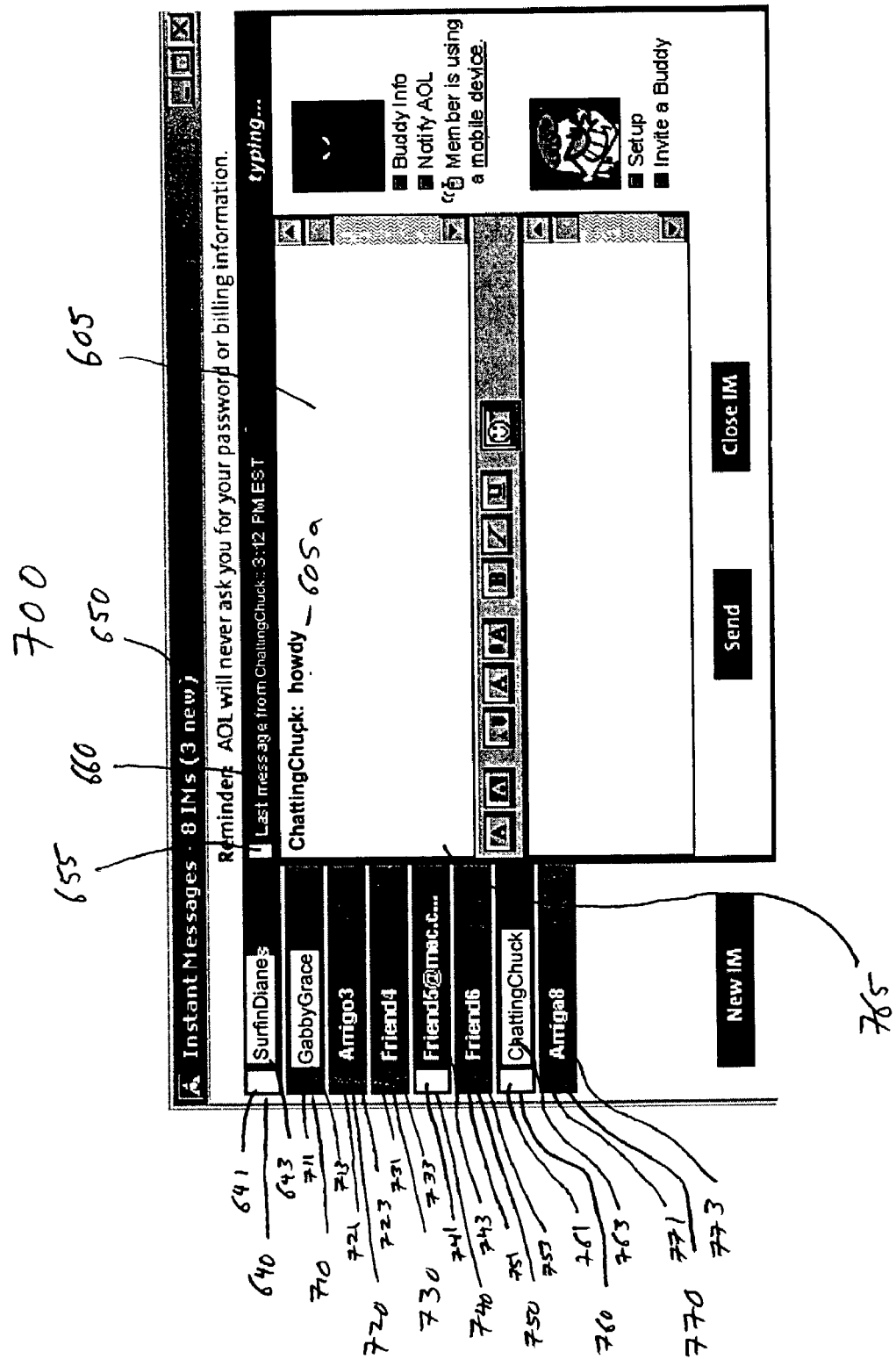

FIG. 7 illustrates an example of a tabbed IM user interface (UI) 700, which is similar to the example discussed above with respect to FIG. 6. In the example of FIG. 7, there are eight tabs corresponding to eight concurrent IM sessions. Each interface tab 640, 710, 720, 730, 740, 750, 760, and 770 is assigned to a pending IM session, and the tabs are arranged within the user interface close to one another. The adjacent placement of the tabs helps, among other things, to ease switching between IM sessions by the user. However, other orientations are possible. In the example of FIG. 7, interface tab 760 is the active tab corresponding to the sub-interface 765 representing the IM session currently being viewed by the user, and tabs 640, 710, 720, 730, 740, 750, and 770 are inactive tabs that correspond to IM sessions which are not currently being viewed by the user. If the user were to cause active display of a different sub-interface, the interface tab 760 would still be displayed and would persist beyond the active display of the associated sub-interface 765, thus enabling identification, selection, and identification of the communication session corresponding to interface tab 760.

Tabs 640, 710, 720, 730, 740, 750, 760, and 770 each have an associated status indicator 641, 711, 721, 731, 741, 751, 761, and 771 and an identifier 643, 713, 723, 733, 743, 753, 763, and 773. In the example of FIG. 7, three of the status indicators 641, 741, and 761 indicate that a new IM message is present and waiting to be viewed in the IM sessions corresponding to their associated tabs 640, 740, and 760. Also, five of the status indicators 711, 721, 731, 751, and 771 indicate that no new IM messages are present and waiting to be viewed in the IM sessions corresponding to their associated tabs 710, 720, 730, 750, and 770. Thus, without having to open each of the pending IM session, the user is supplied with information about which IM sessions have new IM messages and which do not. Also, the identifiers 643, 713, 723, 733, 743, 753, 763, 773 are configured such that a user is able to read or otherwise recognize an identifier even when other IM sessions are concurrently pending.

The information provided to the user by the conversation counter 650 indicates that there are eight (8) total concurrent IM sessions, no new IM sessions (by omission), and three (3) ongoing IM session having a new IM message waiting to be viewed. The UI 700 also includes a last message information indicator 660 that provides information about the time that the last message was received from an IM buddy. In the example of FIG. 7, the last message information indicator 660 provides information relating to the status of the IM session with the IM buddy corresponding to the active tab, in this case "ChattingChuck."

Figure 8:
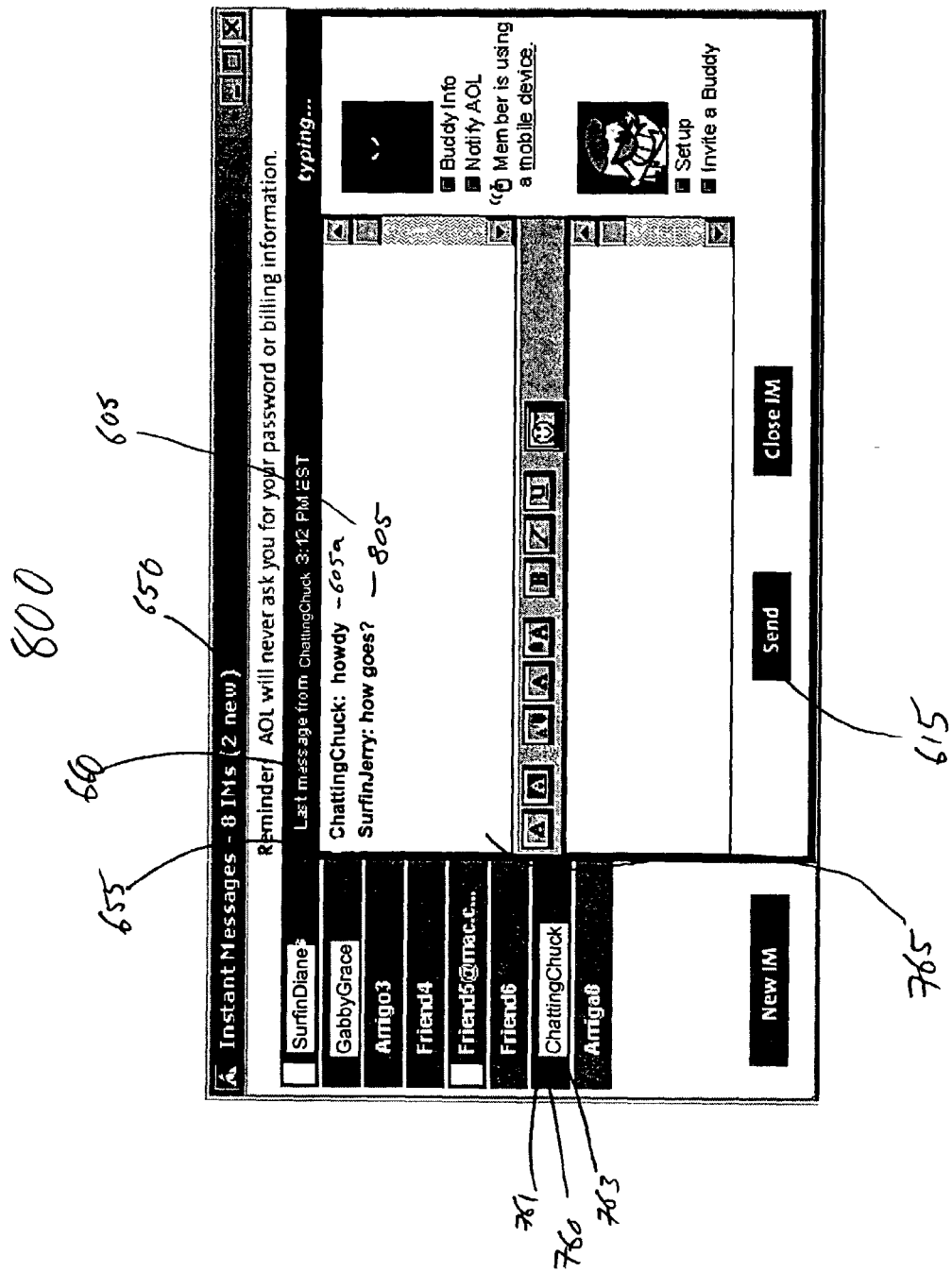

FIG. 8 is an example of a tabbed IM UI 800 and further illustrates the UI that was discussed above with respect to FIG. 7. In the example of FIG. 8, the user, with a screen name of "SurfinJerry," has reviewed the IM 605*a* that was previously received from IM buddy "ChattingChuck," and has sent an IM 805 in reply to that IM 605*a*. By contrast, in the UI 700 of FIG. 7, the user ("SurfinJerry") had not reviewed or replied to the IM message 605*a* in the active IM session 760. Thus, in the example of FIG. 8, no new message is currently pending in the active IM session 760, and the status indicator 761 is updated to reflect this status. Also, the conversation counter 650 is updated to show that there are still eight (8) concurrent IM sessions, but that only two (2) of these sessions have new messages waiting to be viewed. Manual status control 655 may be manipulated by the user to show that no new message is pending and waiting to be viewed in the corresponding IM session, without having to send a message to extinguish indication that a the new message is pending.

Figure 9:
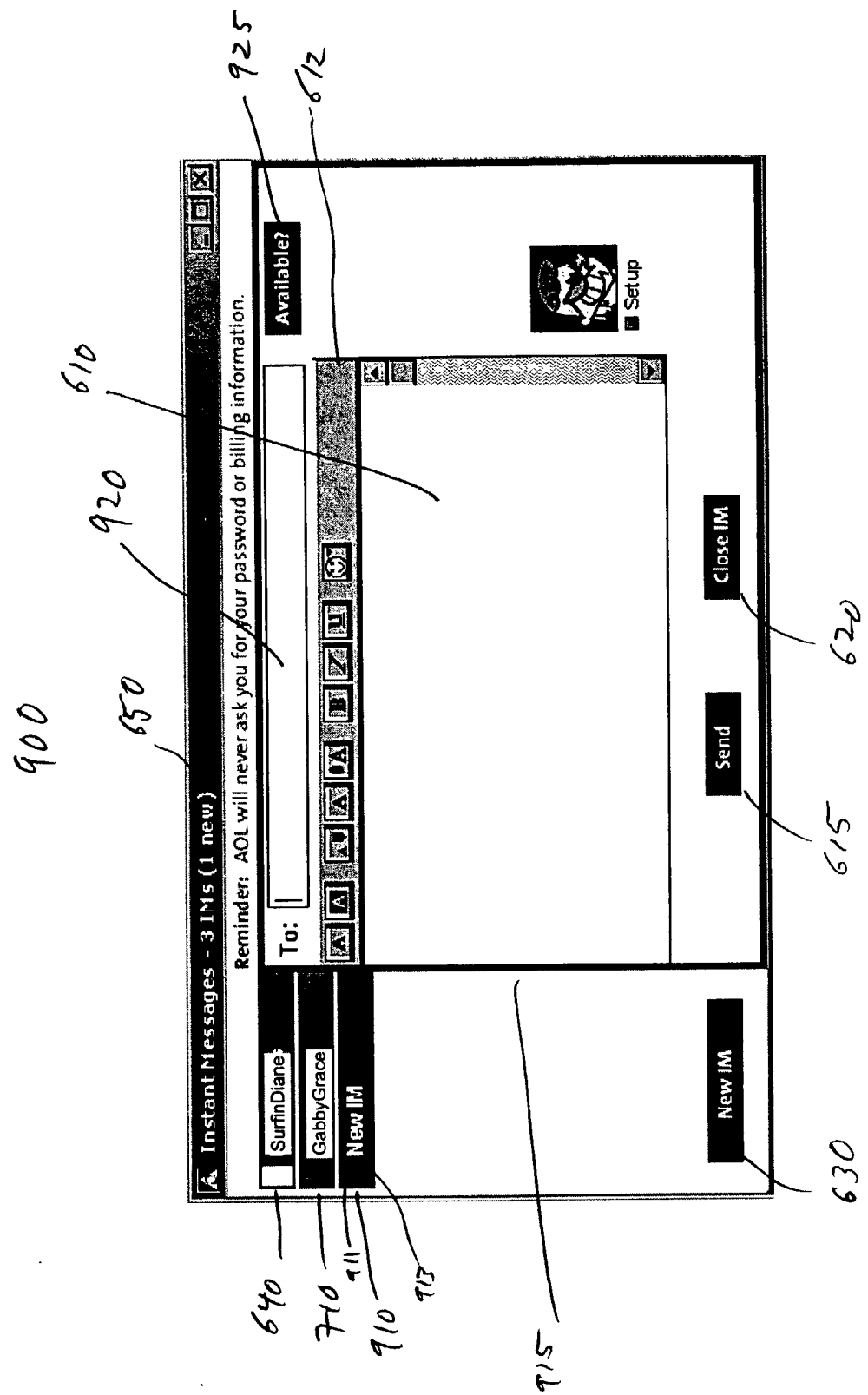

FIG. 9 illustrates yet another example of a tabbed IM UI 900. In the example of FIG. 9, the user has initiated a new IM session and a interface tab 910 associated with the sub-interface 915 corresponding to the new session is rendered. Typically, the user would click on the control button 630 to initiate a new IM session. The user may then specify the screen name of the buddy to whom the user desires to send an IM message by, for example, entering the screen name in box 920 or by selecting the screen name from a buddy list. The user may check to see if the buddy is available to receive an IM message by clicking the button 925. As shown in FIG. 9, the interface tab 910 corresponding to the new IM session is the active tab, and there are two inactive tabs 640 and 710 corresponding to two other concurrent IM sessions. Because 910 represents a new IM session, a corresponding status indicator 911 is rendered which reflects that no new IM messages are pending and waiting to be viewed. Also, the conversation counter 650 is updated to show that there are three (3) concurrent IM sessions, including the new session being initiated by the user, and that only one (1) of these session has a new message (e.g., "SurfinDiane") The identifier 913 may be initially rendered to give an indication that this is a new IM session (e.g., visually distinct from other tabs), and may be updated with the screen name of the buddy to whom an IM will be sent once the user has entered or otherwise selected the buddy. To send the IM message, the user may enter the message in the IM compose area 610, using font and appearance controls 612 as desired, and then click on the send control button 615 to send the message. If the user decides not to send the IM message, the user may click on the close IM control button 620 to exit the IM session.

Figure 10:
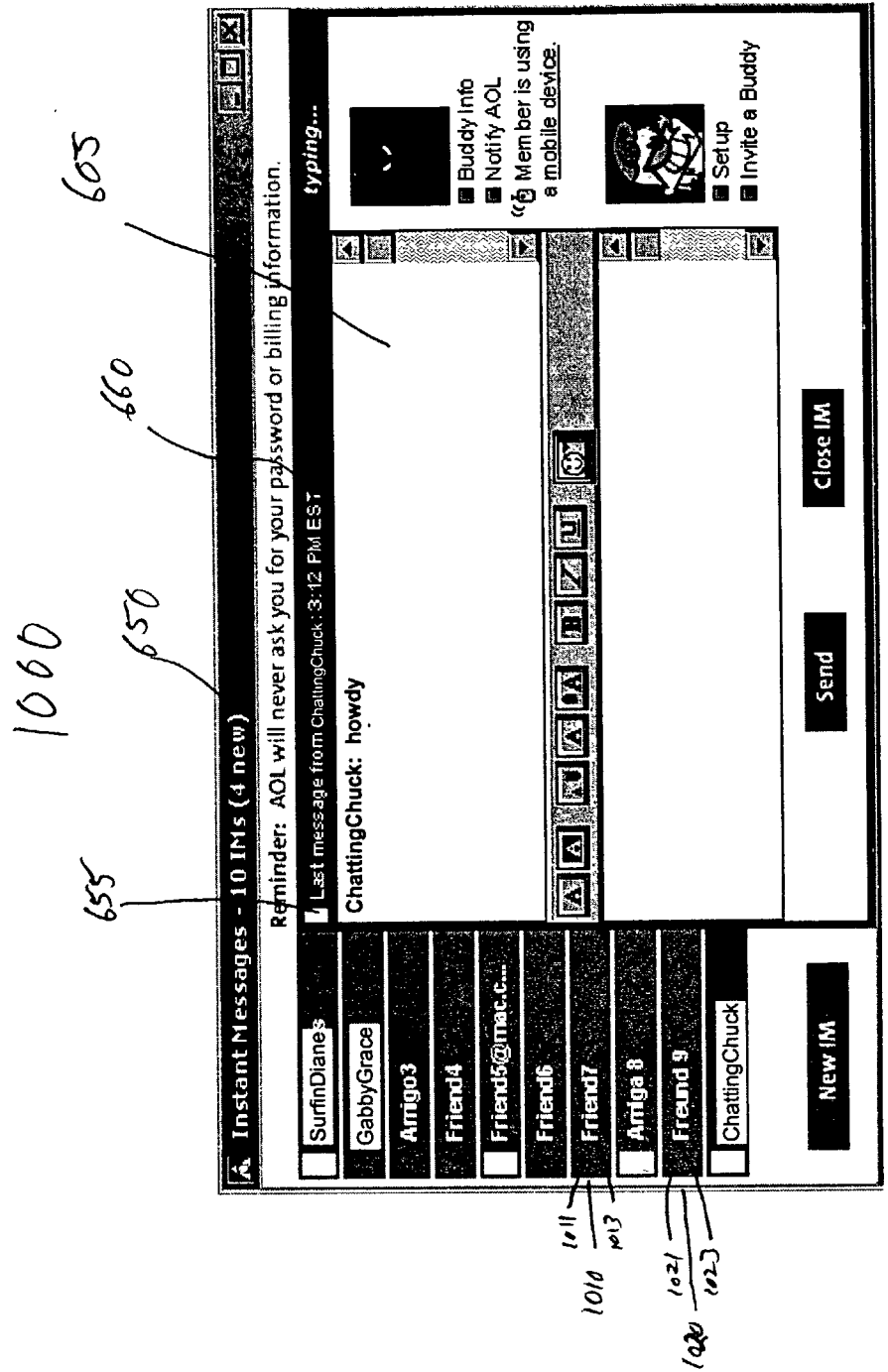

FIG. 10 is an example of a tabbed IM UI 1000 and further illustrates the UI that was discussed above with respect to FIG. 7. In the example of FIG. 10, two additional tabs 1010 and 1020 have been rendered and correspond to two additional IM sessions. The additional tabs 1010 and 1020 each have a status indicator 1011 and 1021 and an indentifer 1013 and 1023. As shown by indicators 1011 and 1021, no new IM messages are waiting to be viewed for the IM sessions corresponding to tabs 1010 and 1020. The conversation counter 650 has been updated to show that there are now ten (10) concurrent IM sessions, compared to the eight (8) concurrent IM sessions shown in FIG. 7, and that four (4) of these ten (10) IM sessions have new IM messages. In the example of FIG. 10, due to limitations imposed by the size of the UI 1000, ten (10) concurrent IM sessions is the maximum number of concurrent IM sessions that may be concurrently displayed. In other implementations, a different value may be used for the maximum number of concurrent IM sessions. Also, the maximum number of concurrent IM sessions for simultaneous display may be a static value or may be a dynamic value. For example, the value may change depending on the size of the window used to display the UI 1000, or a font or size used to display tabs of the UI.

Figure 11:
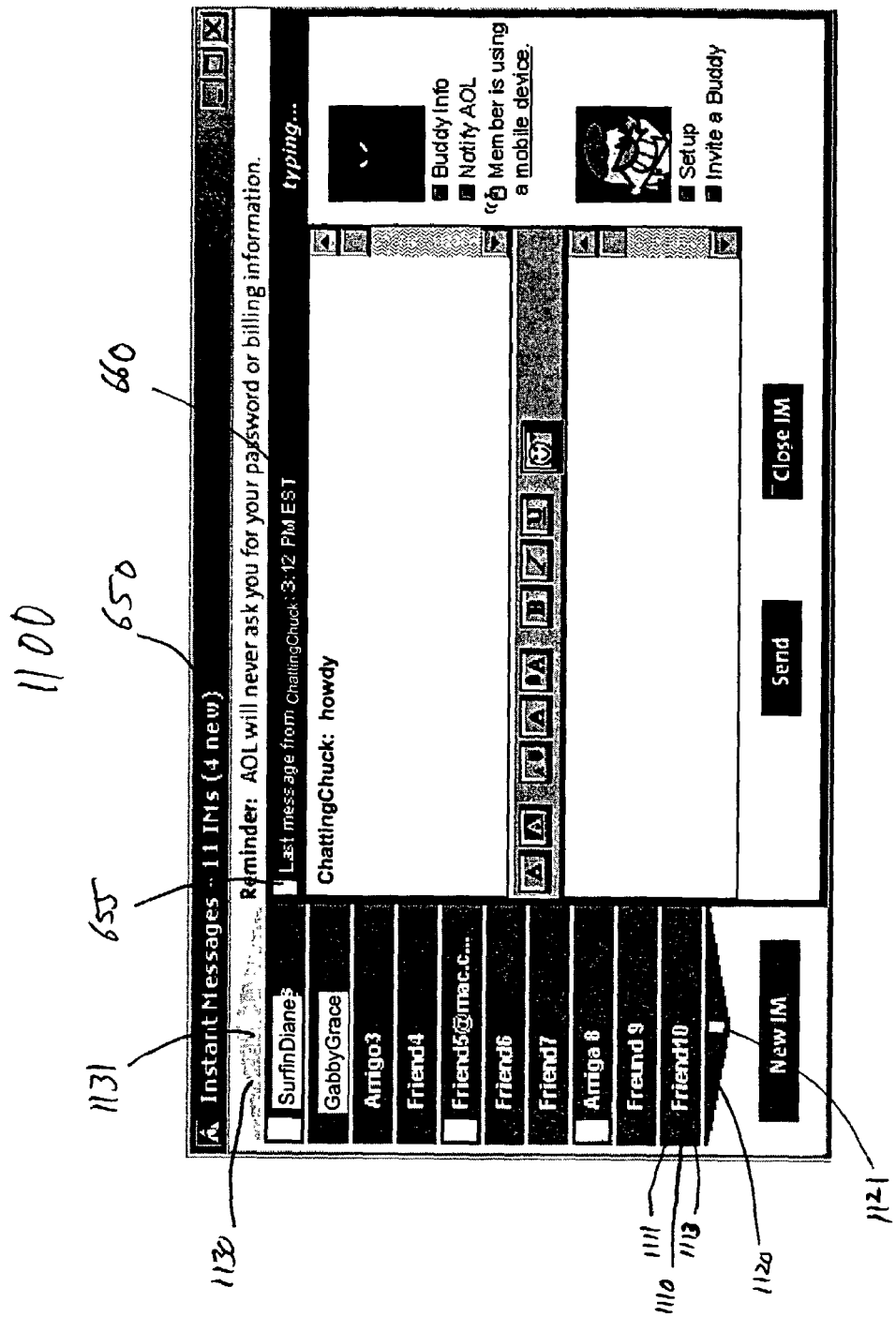

FIG. 11 is an illustration of a tabbed IM UI 1000 and further illustrates the UI discussed above with respect to FIG. 10. In the example of FIG. 11, one additional interface tab 1110 has been rendered and corresponds to one additional IM session, which is not currently in active display. Thus, the interface tab 1110 persists beyond active display of its associated sub-interface. The additional interface tab 1110 has a status indicator 1111 and an identifier 1113. As shown by indicator 1111, no new IM message is waiting to be viewed for the IM sessions corresponding to interface tab 1110. The conversation counter 650 has been updated to show that there are now eleven (11) concurrent IM sessions, compared to the ten (10) concurrent IM sessions shown in FIG. 10, and that four (4) of these eleven (11) IM sessions have new IM messages waiting to be viewed. In the example of FIG. 11, ten (10) concurrent IM sessions is the maximum number of concurrent IM sessions that may be concurrently displayed. Therefore, there is one (1) more concurrent IM session than the maximum number that may be concurrently displayed.

At least one scroll bar 1120 and 1130 is provided for scrolling to perceive tabs corresponding to open IM sessions because the total number of concurrent IM sessions exceeds the maximum number of concurrent conversations that may be displayed simultaneously. The scroll bars 1120 and 1130 allow the user to scroll up and down among the concurrent IM sessions, and provide an indication that one or more of the IM sessions "hidden" by the scroll bar has a new IM message waiting to be viewed. For example, as shown in FIG. 11, scroll bar 1130 appears grayed out (or is removed from the UI altogether), indicating that there are no IM sessions in that direction. By contrast, scroll bar 1120 is not grayed out and indicates that an addition IM session may be viewed by clicking on the scroll bar 1120. Also, status indicators 1121 and 1131 may be provided on the scroll bars 1120 and 1130 to indicate whether one or more of the IM sessions accessible by the scroll bar has a new IM message waiting to be viewed. In the example of FIG. 11, status indicator 1121 indicates that there is a new IM message in the IM session covered by the scroll bar 1120, while status indicator 1131 indicates that there is no new IM message in any IM session covered by scroll bar 1130.

Figure 12:
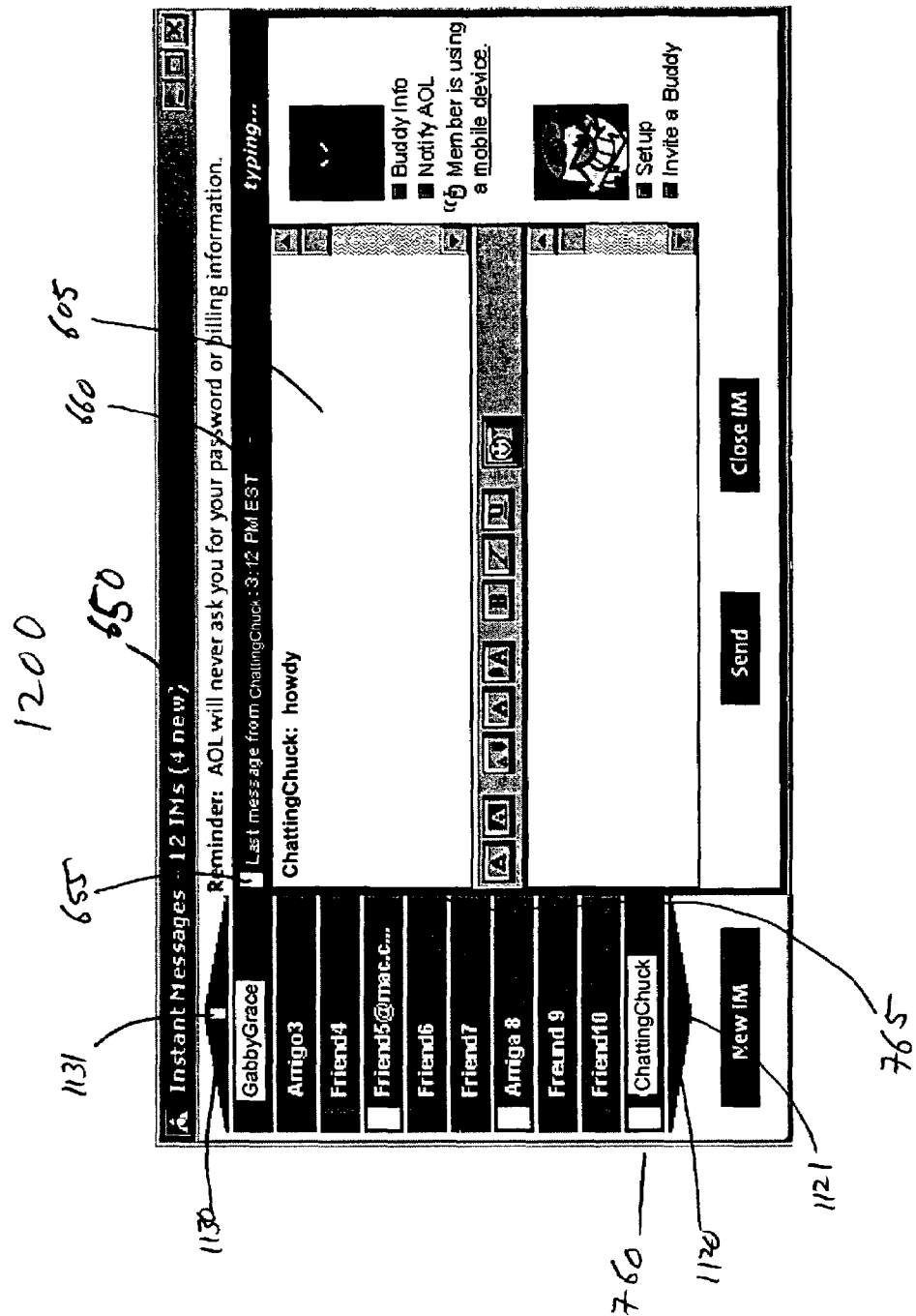

FIG. 12 is an example of a tabbed IM UI 1200 and further illustrates the UI discussed above with respect to FIG. 11. In the example of FIG. 12, one additional IM session has been added, and the interface tab for that IM session has not been rendered because it is covered by scroll bar 1130. In order to access this additional IM session, the user would click on the scroll bar 1130, which would eventually result in the rendering of a interface tab corresponding to the IM session, and then the user may click on the interface tab to make it the active tab to view the IM session. The conversation counter 650 has been updated to show that there are now twelve (12) concurrent IM sessions, compared to the eleven (11) concurrent IM sessions shown in FIG. 11, and that four (4) of these eleven (11) IM sessions have new IM messages waiting to be viewed. In the example of FIG. 12, ten (10) concurrent IM sessions is the maximum number of concurrent IM sessions that may be simultaneously displayed. As previously discussed above, scroll bars 1120 and 1130 are provided because there are two (2) more concurrent IM session than the maximum number that may be displayed. In the example of FIG. 12, neither scroll bar 1120 nor scroll bar 1130 appears grayed out, indicating that an addition IM session may be viewed by clicking on either scroll bar 1120 or scroll bar 1130. Also, status indicators 1121 and 1131 are provided on the scroll bars 1120 and 1130 to indicate whether one or more of the IM sessions accessible by the scroll bars has a new IM message. In the example of FIG. 12, status indicator 1121 indicates that there is no new IM message in any IM session covered by the scroll bar 1120, while status indicator 1131 indicates that there is a new IM message waiting to be viewed in an IM session covered by scroll bar 1130.

Figure 13:
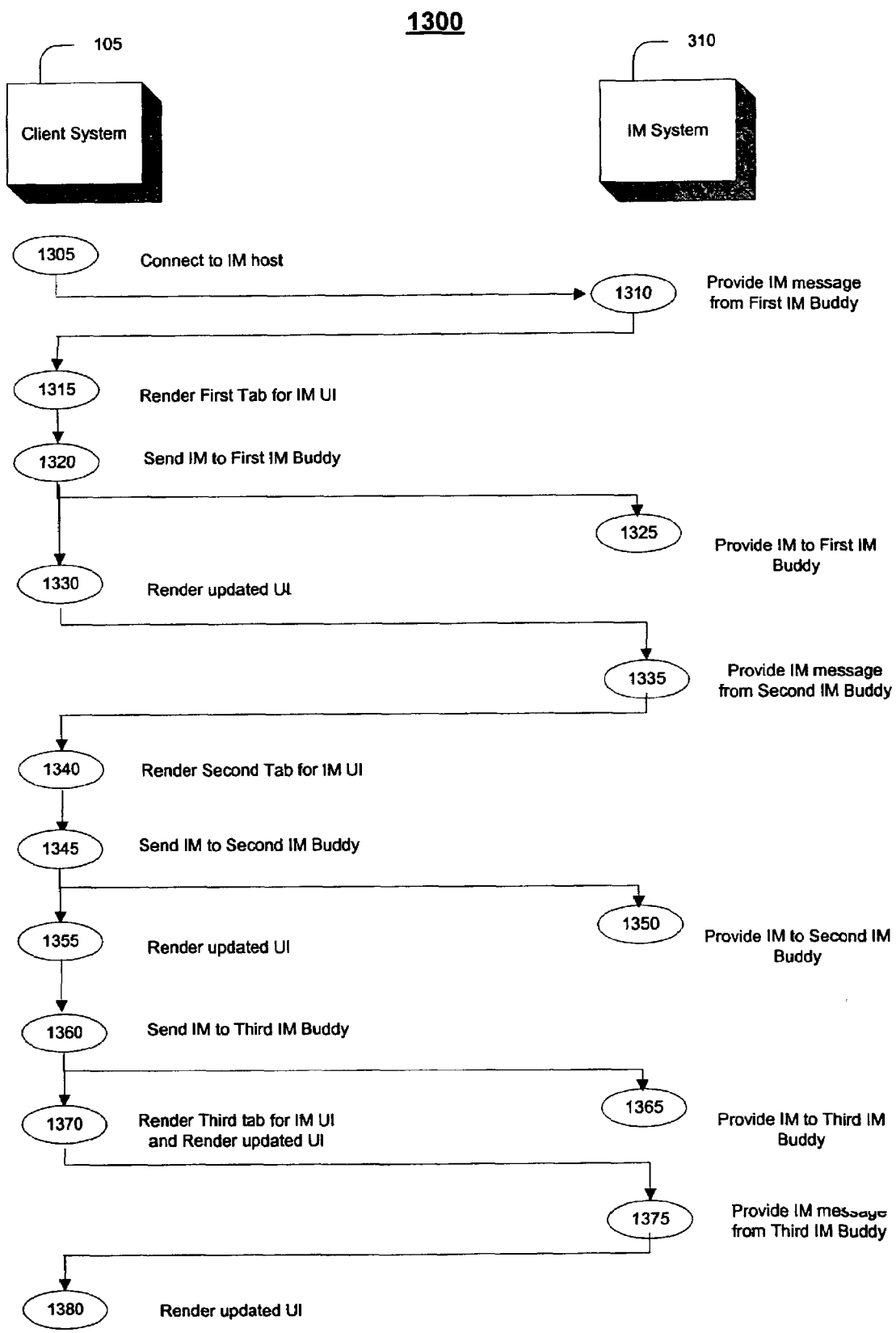
FIG. 13 is a flow chart of a process that may be implemented by the systems of FIGS. 1-4.

Referring to FIG. 13, a client system 105 and an IM host system 310 interact according to a procedure 1300 to provide a tabbed IM user interface. The procedure 1300 may be implemented by any type of hardware, software, device, computer, computer system, equipment, component, program, application code, storage medium, or propagated signal. Furthermore, although not shown in FIG. 13, the client system 105 and the IM host system 310 may be directly or indirectly interconnected through known or described delivery networks, examples of which are described with respect to network 160. In one implementation, the procedure 1300 may be implemented in a client/host context, and the tabbed IM user interface may be accessed or updated through a remote device in a client/host environment. In another implementation, the procedure 1300 may be implemented in a standalone or offline client context. The tabbed IM user interface may be rendered by the stanalone/offline device and may be accessed or updated through a remote device in a non-client/host environment such as, for example, a LAN server serving an end user or a mainframe serving a terminal device. Thus, the procedure 1300 described below may be implemented for any tabbed IM user interface of an OSP, ISP, browser and/or other software program having a graphical user interface, such as programs for word processing, stand-alone browsers, spread sheets, and drawing programs.

Procedure 1300 generally involves rendering a tabbed IM UI having one or more tabs, each interface tab being associated with a sub-interface and assigned to a pending IM session and appearing adjacent to one another while persisting beyond active display of the associated sub-interface. While some functions of procedure 1300 may be performed entirely by the client system 105, other functions may be performed by the collective operation of the client system 105 and the IM host system 310. For example, a tabbed IM UI may be rendered entirely by the client. However, the UI may be rendered based upon information and/or instant messages provided to the client by the IM host system. An IM conversation counter and indicator may be provided for the tabbed IM user interface, as discussed below.

In procedure 1300, the client system 105 and the IM host system 310 are physically and/or logically connected (step 1305). For instance, client system 105 may connected to the IM host system 310 across a network (e.g., network 160) by supplying a user identification and password to a server (e.g., a login server) in order to obtain access to the IM host system 310.

Next, the IM host system 310 provides an IM message from a first IM buddy (step 1310) to the client system 105. The IM host system 310 may provide the IM message across a network 160, and the IM message may include a text message portion, a time of delivery, and a screen name of the first IM buddy.

The client system 105 renders a first interface tab for the IM user interface, examples of which were described with respect to FIGS. 6-12, and assigns the first interface tab to the IM session with the first buddy (step 1315). If the IM session is to be actively displayed, a first sub-interface associated with the interface tab is rendered. In one implementation, the client system 105 renders the first interface tab when the IM message from the first IM buddy is provided, and may separately render other portions of the IM user interface at a different time. In another implementation, the entire IM user interface, including the first interface tab, may be rendered when the IM message is provided. The tabbed IM UI may be presented using a Web page having text, images, audio, video, and/or any other types of content.

As previously discussed, the tabbed IM UI includes a first interface tab corresponding to the IM session with the first buddy, and also may include other tabs corresponding to other IM sessions with other buddies. For example, FIG. 6, as described previously in greater detail illustrates an example of a tabbed IM UI 600 that may be rendered according to step 1315. The IM UI 600 has a first interface tab 640 associated with the first sub-interface 645 corresponding to the IM session with the first buddy.

Rendering the tabbed IM UI may include initializing or updating the status indicator, the identifier, the conversation counter, the display area status indicator, the information indicator, and the display area. For example, as shown in FIG. 6, first interface tab 640 is rendered with an indicator 641 showing that a new message is present in the IM session corresponding to the interface tab and identifier 643 corresponds to the screen name of the first buddy. Conversation counter 650 is initialized to show that there is one IM session and one new IM present waiting to be viewed. Information indicator 660 shows the time of the last message from the first buddy. The IM message from the first buddy appears in IM display area 605. Also, if the maximum number of concurrent IM sessions or interface tabs corresponding to IM sessions available for display is exceeded when the IM message is provided, then rendering the tabbed IM UI may include rendering a scroll arrow, examples of which were described with respect to FIGS. 11 and 12.

Using the client system 105, the user may choose view the IM message from the first buddy and to send an IM message back to the first buddy (step 1320). The client system 105 may send the message to the IM host system 310 by providing the IM message across a network 160. The IM message may include a text message portion, a time of delivery, and a screen name of the user. Referring to FIG. 6, in order to send the message, the user may choose to type the message in the IM compose area 610 and send the message by clicking on the send control 615.

The IM Host system 310 provides the IM message to the first IM buddy (step 1325). The IM host system 310 may provide the IM message across a network 160 to the client system associated with the first buddy (not shown).

Next, the client system 105 renders an updated tabbed IM UI (step 1340). The updated UI may be rendered simultaneously with step 1320, or may be rendered at a later time. Rendering an updated IM UI may include updating the status indicator, the conversation counter, the display area status indicator, the information indicator, and the display area. For example, referring to FIG. 6, the updated UI 600 may be rendered to update the sub-interface 645 and interface tab 640, including the indicator 641 to show that no new message is present and waiting to be viewed in the IM session corresponding to the interface tab. Conversation counter 650 may be updated to show that are no new IM messages present waiting to be viewed. Information indicator 660 may be updated to show the time of the user's message. The user's IM message to the first buddy may also be rendered in the IM display area 605.

The IM host system 310 then provides an IM message from a second IM buddy (step 1335) to the client system 105. As discussed above with respect to step 1310, the IM host system 310 may provide the IM message across a network 160, and the IM message may include a text message portion, a time of delivery, and a screen name of the second IM buddy.

Next, the client system 105 renders a second interface tab for the IM user interface, examples of which were described with respect to FIGS. 7-12, and assigns the second interface tab to the IM session with the second buddy (step 1340). The second interface tab is rendered adjacent to the first interface tab. Typically, the second interface tab will become the active tab and a second sub-interface associated with the second tab will be actively displayed, while the first tab will become an inactive tab and the first sub-interface will no longer be actively displayed. In one implementation, the client system 105 renders the second tab when the IM message from the second IM buddy is provided, and may separately render other portions of the IM user interface at a different time. In another implementation, the entire IM user interface, including the second tab, may be rendered when the IM message is provided.

As an example, FIG. 7, as described previously in greater detail, illustrates a tabbed IM UI 700 that may be rendered according to step 1340. The IM UI 700 includes a second interface tab 760 associated with second sub-interface 765 corresponding to the IM session with the second buddy as the active tab, and a first interface tab 640 corresponding to the IM session with the first buddy as an inactive tab. The first sub-interface 645 corresponding to the IM session with the first buddy is no longer actively displayed, and the first interface tab 640 persists beyond active display of the associated first sub-interface 645 to enable identification, selection, and activation of the associated first IM session. UI 700 also includes other interface tabs 710, 720, 740, 740, 750, and 770 corresponding to other IM sessions with other IM buddies.

Rendering the tabbed IM UI may include initializing or updating the status indicator, the identifier, the conversation counter, the display area status indicator, the information indicator, and the display area. For example, as shown in FIG. 7, second interface tab 760 is rendered with an indicator 761 showing that a new message is present waiting to be viewed in the IM session corresponding to the second interface tab 760 and identifier 764 corresponds to the screen name of the second buddy. Conversation counter 650 is updated to show that there is an additional IM session and an additional new IM present waiting to be viewed. Information indicator 660 now shows the time of the last message from the second buddy. The IM message from the second buddy appears in IM display area 605. Also, if the maximum number of concurrent IM sessions available for display is exceeded when the IM message is provided, then rendering the tabbed IM UI may include rendering a scroll arrow, examples of which were described with respect to FIGS. 11 and 12.

Using the client system 105, the user may choose to send an IM message to the second buddy (step 1345) in a similar fashion to that discussed above with respect to step 1320. Also, similar to the discussion above with respect to step 1325, the IM Host system 310 provides the IM message to the second IM buddy (step 1350).

Next, the client system 105 renders an updated tabbed IM UI (step 1355). The updated UI may be rendered simultaneously with step 1345, or may be rendered at a later time. Rendering an updated IM UI may include updating the status indicator, the conversation counter, the display area status indicator, the information indicator, and the display area. For example, referring to FIG. 8, the updated UI 800 may be rendered to update the second interface tab indicator 761 to show that no new message waiting to be viewed is present in the IM session corresponding to the interface tab 760. Conversation counter 650 may be updated to show that now one fewer new IM message are present. Information indicator 660 may be updated to show the time of the user's message. The user's IM message 805 to the second buddy may also be rendered in the IM display area 605.

Using the client system 105, the user may choose to start a new IM session and send an IM message to a third buddy (step 1360). The client system 105 may send the message to the IM host system 310 by providing the IM message across a network 160. The IM message may include a text message portion, a time of delivery, and a screen name of the user. Referring to FIG. 9, in order to initiate the new IM session and send the message, the user may choose to click on the new IM control 640 which may render a UI 900 for initiating a new IM session, designate the screen name or other identifier of the third IM buddy, for example by typing it into box 920, type the message in the IM compose area 610, and send the message by clicking on the send control 615.

Similar to the discussion above with respect to steps 1325 and 1350, the IM Host system 310 provides the IM message to the third IM buddy (step 1365).

Next, the client system 105 renders an updated UI and renders a third interface tab for the IM user interface, examples of which were described with respect to FIGS. 7-12, and assigns the third interface tab corresponding to a third sub-interface to the IM session with the third buddy (step 1370). The third interface tab is rendered adjacent to the second interface tab. Typically, the third interface tab will become the active tab and a third sub-interface will be actively displayed, while the second interface tab will become an inactive tab and the second sub-interface will no longer be actively displayed. Thus, the second interface tab will persist beyond active display of the second sub-interface. In one implementation, the client system 105 renders the third interface tab and actively displays the third sub-interface when the IM message for the third IM buddy is initiated, and may separately render other portions of the IM user interface at a different time. In another implementation, the entire IM user interface, including the third interface tab and third sub-interface, may be rendered when the IM message is sent.

Rendering an updated tabbed IM UI may include initializing or updating the status indicator, the identifier, the conversation counter, the display area status indicator, the information indicator, and the display area. For example, a third interface tab may be rendered with an indicator showing that no new message is present waiting to be viewed from the third buddy in the IM session corresponding to the third interface tab and an identifier is rendered that corresponds to the screen name of the third buddy. The conversation counter is updated to show that there is an additional IM session and no additional new IM waiting to be viewed is present. An information indicator may be rendered to show the time of the last message from the user to the third buddy, and the display area indicator may be rendered to show that there is no new message yet from the third buddy. The IM message from the user to the third buddy may be rendered in an IM display area. Also, if the addition of the new IM session causes the maximum number of concurrent IM sessions or concurrent IM interface tabs available for display to be exceeded, then rendering the updated tabbed IM UI may include rendering a scroll arrow, examples of which were described with respect to FIGS. 11 and 12.

The IM host system 310 then provides an IM message from the third IM buddy (step 1375) to the client system 105. As discussed above with respect to steps 1310 and 1335, the IM host system 310 may provide the IM message across a network 160, and the IM message may include a text message portion, a time of delivery, and a screen name of the third IM buddy.

Next, the client system 105 renders an updated tabbed IM UI (step 1380). The updated UI may be rendered when the IM message from the third IM buddy is provided, and may separately render other portions of the IM user interface at a different time or the entire IM user interface may be updated when the IM message is provided. Rendering an updated IM UI may include updating the status indicator, the conversation counter, the display area status indicator, the information indicator, and the display area, as discussed above with respect to step 1355. For example, the updated UI may be rendered to update the third interface tab indicator to show that a new message is present in the IM session corresponding to the third interface tab. The conversation counter may be updated to show that there is one additional new IM message present waiting to be viewed. The information indicator may be updated to show the time of the third buddy's message, and the display area indicator may be updated to show that there is a new message waiting to be viewed from the third buddy. The third buddy's IM message may also be rendered in the IM display area.

The relative placement of steps 1310-1380 with respect to other steps in FIG. 13, and with respect to each other, may vary.

Other implementations are within the scope of the following claims. For example, although the examples above are given in an instant message context, other communications systems with similar attributes may be used. Also, the user interface may be a viewable interface, an audible interface, a tactile interface, or any combination thereof.

What is claimed is:

1. A user interface on a display that enables user perception of status regarding communications that leverage an instant messaging platform, the user interface comprising:
   an instant messaging application user interface that enables perception and selection of instant messages for an instant messaging user, the instant messaging application user interface including:
      an instant messaging conversation display area configured to display instant messages exchanged in instant messaging conversations of the user,
      interface actionable items, each interface actionable item being associated with a sender and configured to enable display on an instant messaging conversation between the sender and the user in the instant messaging conversation display area when activated, and
      an interface actionable item display area configured to, if the interface actionable items exceeds a maximum number, display the maximum number of interface actionable items as visible interface actionable items and maintain the interface actionable items not displayed as hidden interface actionable items; and
      a status indicator providing a perceivable indication to the user of statistics comprising a first number making perceivable a number of senders from whom at least one unacknowledged instant message has been received and a second number making perceivable a total number of senders with which the user is engaging in concurrent instant messaging sessions, the statistics including senders associated with each of the interface actionable items that are visible and hidden.

2. The user interface of claim 1 further comprising one or more instant messaging sub-interfaces that represent distinct and concurrent instant messaging communications sessions.

3. The user interface of claim 1 further comprising a perceivable status indication that a new message is pending in at least one concurrent instant messaging session.

4. The user interface of claim 1 further comprising a mechanism to determine the statistics.

5. The user interface of claim 1 in which the statistics further comprise a third number making perceivable a number of new instant messaging sessions.

6. The user interface of claim 1 in which the statistics further comprise a third number making perceivable a number of new senders from whom at least one unacknowledged instant message has been received and a fourth number making perceivable a number of old senders from whom at least one unacknowledged instant message has been received.

7. The user interface of claim 1 in which the statistics further comprise a third number making perceivable a total number of new instant messages.

8. The user interface of claim 1 in which the user interface comprises a visual interface.

9. The user interface of claim 1 in which the user interface comprises an audible interface.

10. The user interface of claim 1 in which the statistics are rendered in a title bar.

11. The user interface of claim 1 in which the statistics are rendered in a tab header in an interface having persistent tabs.

12. The user interface of claim 1 in which the statistics are rendered in an operating system tray.

13. The user interface of claim 1 in which the statistics are rendered in a user interface toolbar.

14. The user interface of claim 1 in which the statistics are rendered in a general interface that persists beyond active display of the user interface.

15. The user interface of claim 1 in which the statistics are rendered in a general interface actionable item that is arranged in a position on the display and that persists beyond active display of the user interface, the general interface actionable item being configured to enable activation of the user interface.

16. An article comprising a storage medium having encoded thereon software for implementing a user interface on a display that enables user perception of status regarding communications that leverage an instant messaging platform, the software including instructions that, when executed by a computer, cause the computer to:
   render a user interface on a display that enables user perception of status regarding communications that leverage an instant messaging platform, the user interface comprising an instant messaging application user interface that enables perception and selection of instant messages for an instant messaging user, the instant messaging application user interface including:
      an instant messaging conversation display area configured to display instant messages exchanged in instant messaging conversations of the user; interface actionable items, each interface actionable item being associated with a sender and configured to enable display of an instant messaging conversation between the sender and the user in the instant messaging conversation displaying area when activated, and an interface actionable item display area configured to, if the interface actionable items exceeds a maximum number, display the maximum number of interface actionable items as visible interface actionable items and maintain the interface actionable items not displayed as hidden interface actionable items; and render a status indicator providing a perceivable indication to the user to statistics comprising a first number making perceivable a number of senders from who at least one unacknowledged instant message has been received and a second number making perceivable a total number of senders with which the user is engaging in concurrent instant messaging sessions, the statistics including senders associated with each of the interface actionable items that are visible and hidden.

17. The article of claim 16 further comprising instructions that, when executed by a computer, cause the computer to render one or more instant messaging sub-interfaces that represent distinct and concurrent instant messaging communications sessions.

18. The article of claim 16 further comprising instructions that, when executed by a computer, cause the computer to render a perceivable status indication that a new message is pending in at least one concurrent instant messaging session.

19. The article of claim 16 further comprising instructions that, when executed by a computer, cause the computer to determine the statistics.

20. The article of claim 16 in which the statistics further comprise a third number making perceivable a number of new instant messaging sessions.

21. The article of claim 16 in which the statistics further comprise a third number making perceivable a number of new senders from whom at least one unacknowledged instant message has been received and a fourth number making perceivable a number of old senders from whom at least one unacknowledged instant message has been received.

22. The article of claim 16 in which the statistics further comprise a third number making perceivable a total number of new instant messages.

23. The article of claim 16 further comprising instructions that, when executed by a computer, cause the computer to render the user interface as a visual interface.

24. The article of claim 16 further comprising instructions that, when executed by a computer, cause the computer to render the user interface as an audible interface.

25. The article of claim 16 further comprising instructions that, when executed by a computer, cause the computer to render the statistics in a title bar.

26. The article of claim 16 further comprising instructions that, when executed by a computer, cause the computer to render the statistics in a tab header in an interface having persistent tabs.

27. The article of claim 16 further comprising instructions that, when executed by a computer, cause the computer to render the statistics in an operating system tray.

28. The article of claim 16 further comprising instructions that, when executed by a computer, cause the computer to render the statistics in a user interface toolbar.

29. The article of claim 16 further comprising instructions that, when executed by a computer, cause the computer to render the statistics in a general interface that persists beyond active display of the user interface.

30. The article of claim 16 further comprising instructions that, when executed by a computer, cause the computer to render the statistics in a general interface actionable item that is arranged in a position on the display and that persists beyond active display of the user interface, the general interface actionable item being configured to enable activation of the user interface.

31. An electronic system comprising:
   means for rendering a user interface on a display that enables user perception of status regarding communications that leverage an instant messaging platform, the user interface comprising an instant messaging application user interface that enables perception and selection of instant messages for an instant messaging user, the instant messaging application user interface including:
      an instant messaging conversation display are configured to display instant messages exchanged in instant messaging conversation of the user,
      interface actionable items, each interface actionable item being associated with a sender and configured to enable display of an instant messaging conversation between the sender and the user in the instant messaging conversation display area when active, and
      an interface actionable item display area configured to, if the interface actionable items exceeds a maximum number, display the maximum number of interface actionable items as visible interface actionable items and maintain the interface actionable items not displayed as hidden interface actionable items; and
   means for rendering a status indicator providing a perceivable indication to the user of statistics comprising a first number making perceivable a number of senders from whom at least one unacknowledged instant message has been received and a second number making perceivable a total number of senders with which the user is engaging in concurrent instant messaging sessions, the statistics including senders associated with each of the interface actionable items that are visible and hidden.

32. The electronic system of claim 31 further comprising means for rendering one or more instant messaging sub-interfaces that represent distinct and concurrent instant messaging communications sessions.

33. The electronic system of claim 31 further comprising means for rendering a perceivable status indication that a new message is pending in at least one concurrent instant messaging session.

34. The electronic system of claim 31 further comprising means for determining the statistics.

35. The electronic system of claim 31 in which the statistics further comprise a third number making perceivable a number of new instant messaging sessions.

36. The electronic system of claim 31 in which the statistics further comprise a third number making perceivable a number of new senders from whom at least one unacknowledged instant message has been received and a fourth number making perceivable a number of old senders from whom at least one unacknowledged instant message has been received.

37. The electronic system of claim 31 in which the statistics further comprise a third number making perceivable a total number of new instant messages.

38. The electronic system of claim 31 in which the user interface comprises a visual interface.

39. The electronic system of claim 31 in which the user interface comprises an audible interface.

40. The electronic system of claim 31 in which the statistics are rendered in a title bar.

41. The electronic system of claim 31 in which the statistics are rendered in a tab header in an interface having persistent tabs.

42. The electronic system of claim 31 in which the statistics are rendered in an operating system tray.

43. The electronic system of claim 31 in which the statistics are rendered in a user interface toolbar.

44. The electronic system of claim 31 in which the statistics are rendered in a general interface that persists beyond active display of the user interface.

45. The electronic system of claim 31 in which the statistics are rendered in a general interface actionable item that is arranged in a position on the display and that persists beyond active display of the user interface, the general interface actionable item being configured to enable activation of the user interface.

46. The user interface of claim 1 further comprising a perceivable status indicator for each concurrent instant messaging session, each perceivable status indicator indicating whether or not the corresponding instant messaging session has at least one new message.

47. The user interface of claim 46 in which at least one perceivable status indicator is hidden from the user and at least one perceivable status indicator is visible to the user.

48. The user interface of claim 1 further comprising an actionable item that reveals at least one hidden interface actionable item when activated.

49. The user interface of claim 48 in which the actionable item includes a perceivable status indicator whether or not at least one hidden interface actionable item is associated with a sender from whom at least one unacknowledged instant message has been received.

50. The user interface of claim 1 further comprising an actionable item configured to enable the user to indicate a message as acknowledged.

51. The user interface of claim 1 wherein, upon initiation of a new instant messaging session, the interface actionable item display area is configured to, if the interface actionable items exceeds a maximum number, maintain a new interface actionable item corresponding to the new instant messaging session as a hidden interface actionable item, and the status indicator is configured to display updated statistics based on the new instant messaging session.

52. The user interface of claim 1 wherein, upon initiation of a new instant messaging session, the interface actionable item display area is configured to, if the interface actionable items exceeds a maximum number, display a new interface actionable item corresponding to the new instant messaging session as a visible interface actionable item and maintain an old interface actionable item, displayed in the interface actionable item display area prior to the initiation of the new instant messaging session, as a hidden interface actionable item.

53. The user interface of claim 52 wherein the instant messaging conversation display area is configured to maintain an existing display of instant messages associated with an old instant messaging session such that instant messages associated with the new instant messaging session are not displayed unless the user activates the new interface actionable item.

54. The user interface of claim 1 wherein, upon initiation of a new instant messaging session, the interface actionable item display area is configured to display a new interface actionable item corresponding to the new instant messaging session, and the instant messaging conversation display area is configured to maintain an existing display of instant messages associated with an old instant messaging session such that instant messages associated with the new instant messaging session are not displayed unless the user activates the new interface actionable item.

* * * * *